United States Patent
Tawakol et al.

(10) Patent No.: US 11,120,163 B2
(45) Date of Patent: Sep. 14, 2021

(54) ASSOCIATING ANONYMOUS INFORMATION WITH PERSONALLY IDENTIFIABLE INFORMATION IN A NON-IDENTIFIABLE MANNER

(71) Applicant: ORACLE INTERNATIONAL CORPORATION, Redwood Shores, CA (US)

(72) Inventors: Omar Tawakol, Los Altos, CA (US); David Abraham Wiener, Redwood City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 455 days.

(21) Appl. No.: 14/941,047

(22) Filed: Nov. 13, 2015

(65) Prior Publication Data

US 2016/0142379 A1    May 19, 2016

Related U.S. Application Data

(60) Provisional application No. 62/080,134, filed on Nov. 14, 2014.

(51) Int. Cl.
*G06F 21/62* (2013.01)
*H04L 29/06* (2006.01)
(Continued)

(52) U.S. Cl.
CPC ..... *G06F 21/6254* (2013.01); *G06Q 30/0254* (2013.01); *G06Q 30/0269* (2013.01);
(Continued)

(58) Field of Classification Search
CPC ............. G06F 21/6254; H04L 63/0407; H04L 63/0414; H04L 63/0421; H04L 2209/42;
(Continued)

(56) References Cited

U.S. PATENT DOCUMENTS 7,269,578 B2 * 9/2007 Sweeney ........... G06F 17/30424
705/64
8,140,502 B2 * 3/2012 Francis .................. G06F 17/30
707/705
(Continued)

FOREIGN PATENT DOCUMENTS

GB           2455099 A  *  6/2009  ......... G06Q 30/0269

OTHER PUBLICATIONS

Ad Ops Insider, "Data Management Part IV: Syncing Offline Data to Your DMP", Jul. 22, 2011, 3 pages, URL http://www.adopsinsider.com/online-ad-measurement-tracking/data-management-platforms/data-management-part-iv-syncing-offline-data-to-your-dmp/.

(Continued)

*Primary Examiner* — Zachary A. Davis
(74) *Attorney, Agent, or Firm* — Kilpatrick Townsend & Stockton LLP

(57) ABSTRACT

The present disclosure provides a detailed description of techniques used in methods, systems, and computer program products for associating anonymous information with personally identifiable information without sharing any personally identifiable information. A method receives a specification record comprising one or more specified demographic attributes to be used in user record selection operations, the results of which operations include user records that comprise a user identifier and at least some non-personally-identifiable information. A candidate group is formed by applying a set of rules over the retrieved user records to exclude one or more user records that comprise mutually-exclusive characteristics with respect to the other user records in the candidate group. An anonymity measure is calculated over the candidate group to satisfy a threshold of anonymity. If needed to satisfy the threshold of anonymity, (Continued)

additional user records are added to the group before any sharing operations. Anonymity of the users is preserved.

18 Claims, 12 Drawing Sheets

(51) Int. Cl.
    *G06Q 30/02*         (2012.01)
    *H04L 29/08*         (2006.01)

(52) U.S. Cl.
    CPC .......... *H04L 63/0421* (2013.01); *H04L 67/22* (2013.01); *H04L 67/306* (2013.01)

(58) Field of Classification Search
    CPC .. G06Q 20/383; G06Q 30/02; G06Q 30/0241; G06Q 30/0251; G06Q 30/0254; G06Q 30/0269; G06Q 30/0271; G06Q 30/0276; G06Q 30/0277; G06Q 30/0615
    See application file for complete search history.

(56) References Cited

U.S. PATENT DOCUMENTS

| | | | | |
|---|---|---|---|---|
| 8,281,005 | B2* | 10/2012 | Vanderhook | G06Q 30/02 709/224 |
| 8,594,623 | B2* | 11/2013 | Kovacs | G06Q 30/04 379/114.03 |
| 8,752,149 | B2* | 6/2014 | Emura | G06F 21/6254 726/5 |
| 8,763,150 | B2* | 6/2014 | Flake | G06F 21/6245 709/223 |
| 8,812,524 | B2* | 8/2014 | Chen | G06F 17/30539 |
| 9,047,488 | B2* | 6/2015 | Allen | G06F 21/6254 |
| 9,626,693 | B2* | 4/2017 | Smith | G06Q 30/0257 |
| 9,842,215 | B2* | 12/2017 | Freudiger | G06F 21/602 |
| 9,858,426 | B2* | 1/2018 | Freudiger | G06F 16/22 |
| 9,955,869 | B2* | 5/2018 | Meltzer | A61B 5/0002 |
| 2013/0282493 | A1* | 10/2013 | Lita | G06F 17/30035 705/14.66 |
| 2014/0304244 | A1* | 10/2014 | Toyoda | G06F 21/6254 707/696 |
| 2015/0033356 | A1* | 1/2015 | Takenouchi | H04L 63/0407 726/26 |
| 2015/0149208 | A1* | 5/2015 | Lynch | G06F 19/322 705/3 |
| 2016/0048868 | A1* | 2/2016 | Mirisola | G06Q 30/0245 705/14.44 |
| 2016/0127289 | A1 | 5/2016 | Papa et al. | |

OTHER PUBLICATIONS

Chris O'Hara, iMedia Connection, "Matching Offline Date for Online Targeting", Jan. 3, 2013, 3 pages, URL http://blogs.imediaconnection.com/blog/2013/01/03/matching-offline-data-for-online-targeting/.

Dan Scudder, LiveRamp, "A Primer on Data Onboarding", Aug. 22, 2012, 3 pages, URL http://liveramp.com/blog/a-primer-on-data-onboarding/.

Jeremy Lizt, LiveRamp, "Data Onboarding System Overview", Oct. 3, 2012, 2 pages, URL http://blog.liveramp.com/2012/10/03/data-onboarding-system-overview/.

\* cited by examiner

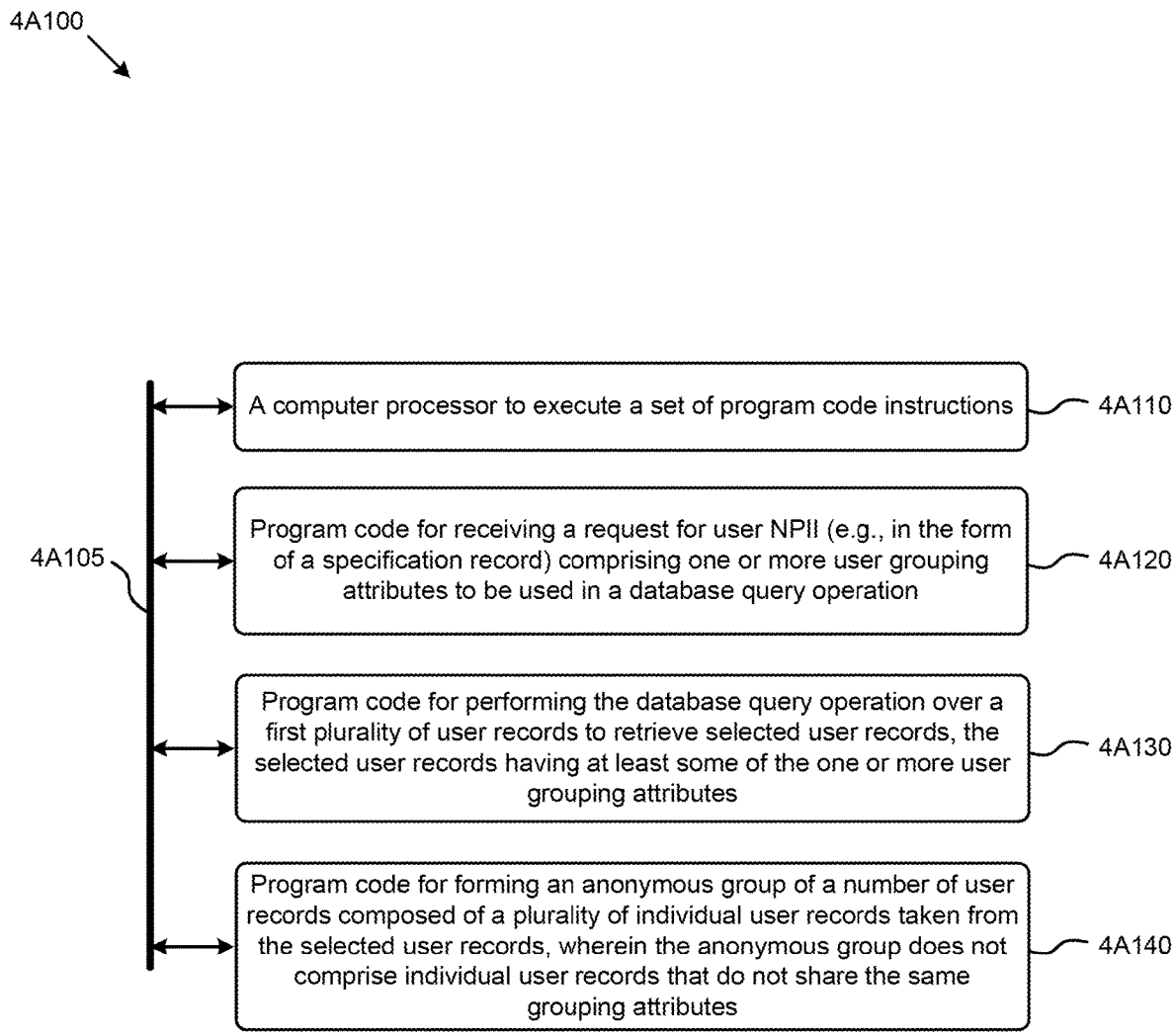
FIG. 4A1

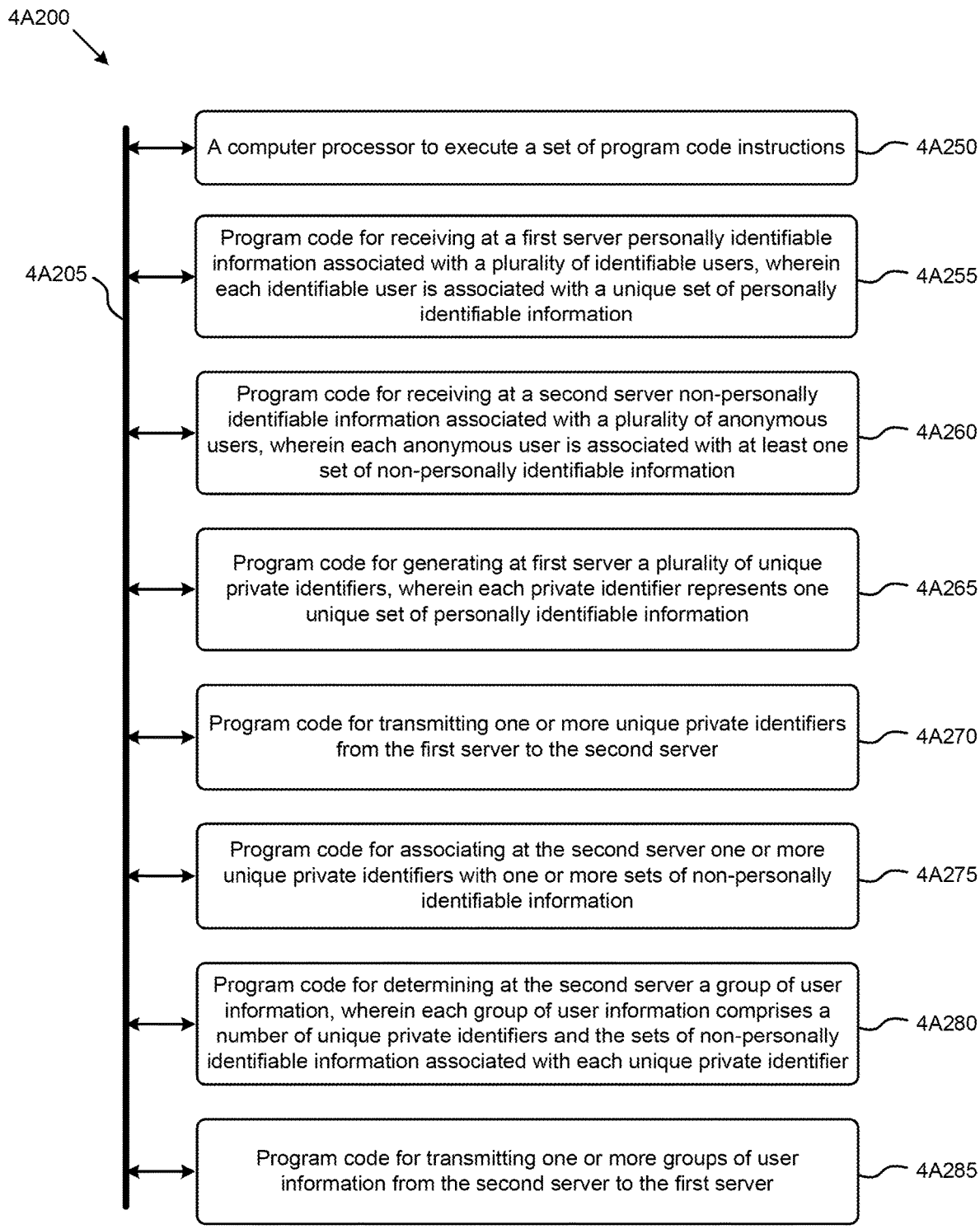
FIG. 4A2

ASSOCIATING ANONYMOUS INFORMATION WITH PERSONALLY IDENTIFIABLE INFORMATION IN A NON-IDENTIFIABLE MANNER

CROSS-REFERENCE TO RELATED APPLICATION(S)

This application claims priority to U.S. Provisional Patent Application Ser. No. 62/080,134, filed on Nov. 14, 2014 entitled "ASSOCIATING ANONYMOUS INFORMATION TO PERSONALLY IDENTIFIABLE INFORMATION IN A NON-IDENTIFIABLE MANNER", which is hereby expressly incorporated by reference in its entirety.

FIELD

This disclosure relates to the field of collection of data for an Internet media campaign and more particularly to techniques for associating anonymous information with personally identifiable information in a manner that avoids sharing the collected data in a personally identifiable way.

BACKGROUND

Online advertisers want to know as much as possible about people so as to prosecute highly targeted advertising campaigns. In some cases, data that is collected against personally identifiable information (PII) can be associated with non-personally identifiable information (NPII) and, in other cases, data collected in an NPII environment cannot be associated back with PII. There is a large volume of rich profile and behavioral data that is collected in anonymous or NPII contexts (e.g., mobile browsing, online browsing, physical-location capture, etc.) and the privacy rules, as well as user privacy expectations, introduce challenges to be overcome so as to allow NPII (e.g., behavioral data) to be used in targeted (e.g., using PII) advertising campaigns.

Legacy approaches have attempted to obfuscate pairing of PII with other data merely by adding enough "noise" so as to obliterate the pairing, however this legacy technique has an undesired side effect of associating potentially incorrect information with a user profile. Other legacy approaches obfuscate the pairing of PII with other data by aggregating multiple users into a group. Unfortunately, application of this legacy technique produces groups that are overly broad (e.g., a particular user who is known to be "interested in cars" is mixed into a group with users who are "living in Los Angeles"). When employed in a targeted advertising campaign that targets users in a non-PII manner, the aforementioned legacy technique to obfuscate pairing of PII with other data also risks delivering advertisements to users who are not "interested in cars".

Privacy laws or privacy expectations may prevent advertisers from getting too much information about each user beyond each advertiser's direct interactions with the user. Techniques are needed to reach larger target audiences in a messaging campaign, regardless of the particular device that an audience member might be using, regardless of the source of information (possibly from different potential advertisers) that would make a particular audience member a good target for the marketing message, and without violating the privacy laws or privacy expectations of any individual.

Advertisers want to narrowly target users while observing privacy regulations. Therefore, what is needed is a technique or techniques that produces groups or sets of similar users (e.g., having similar profiles), yet in a manner such that dissemination of a group or set as a whole does not divulge pairing between a user's personally identifiable information and other data.

What is needed is a technique or techniques to improve over legacy approaches.

BRIEF DESCRIPTION OF THE DRAWINGS

The drawings described below are for illustration purposes only. The drawings are not intended to limit the scope of the present disclosure. This patent or application file contains at least one drawing executed in color. Copies of this patent or patent application publication with color drawing(s) will be provided by the Office upon request and payment of fees.

FIG. 4A1, FIG. 4A2, and FIG. 4B are block diagrams of systems for implementing all or portions of any of the embodiments described herein.

DETAILED DESCRIPTION

Overview

Figure 1A:
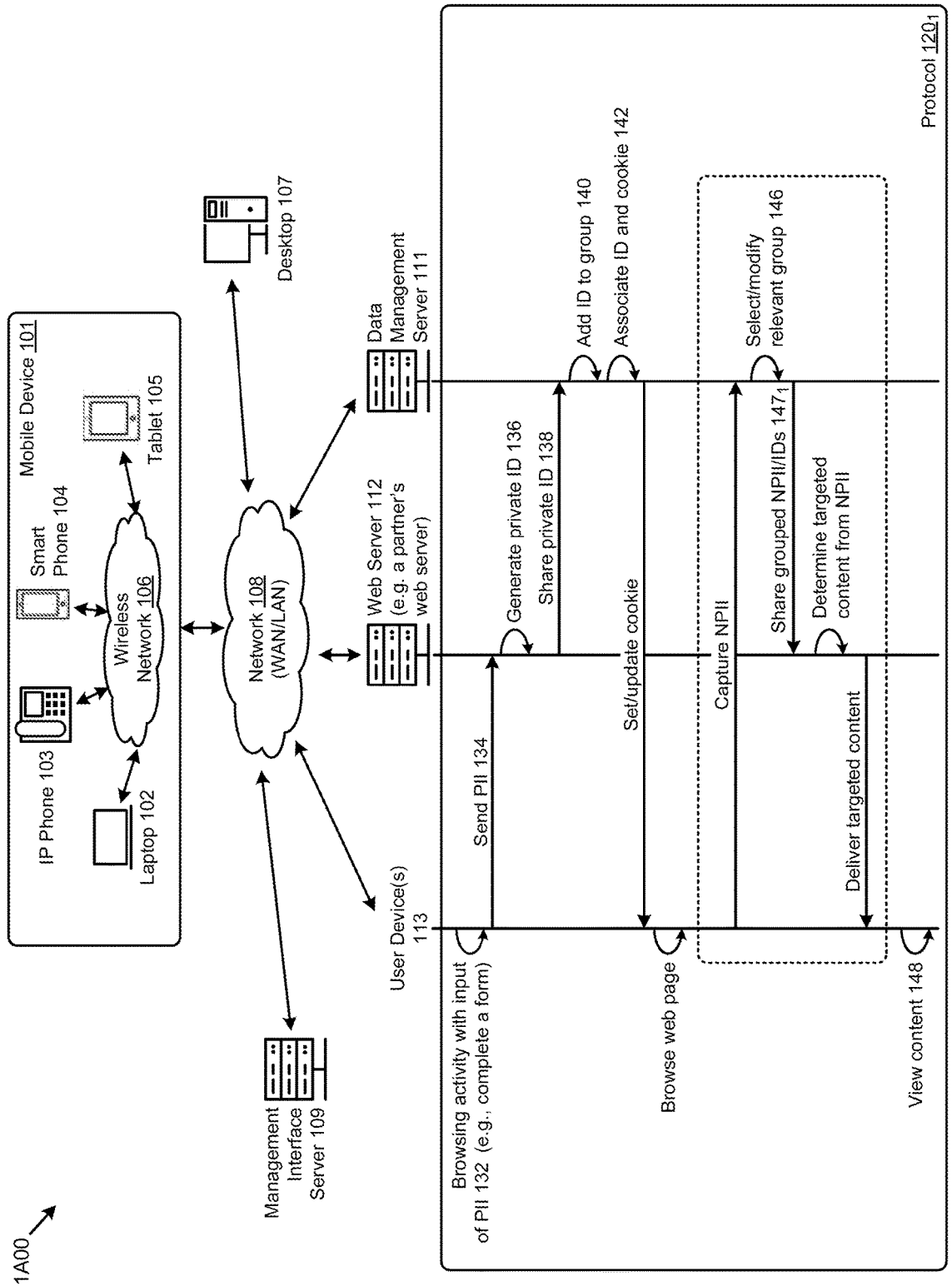
FIG. 1A depicts an environment in which anonymous information is associated with personally identifiable information without sharing personally identifiable information, according to one embodiment.

Online advertisers want to know as much as possible about people so as to prosecute highly targeted advertising campaigns. In some cases, data that is collected against personally identifiable information (PII) can be associated with non-personally identifiable information (NPII) and, in other cases, data collected in an NPII environment cannot be associated back with PII. There is a large volume of rich profile and behavioral data that is collected in anonymous or NPII contexts (e.g., mobile browsing, online browsing, physical-location capture, etc.) and the privacy rules, as well as user privacy expectations, introduce challenges to be overcome so as to allow NPII (e.g., behavioral data) to be used in targeted (e.g., using PII) advertising campaigns.

What is needed is a technique or techniques that address the problem of sharing information about a user without identifying the user to whom the information pertains. Further, what is needed is a technique or techniques for generating groups of users who are in some ways similar while obfuscating correspondence or association with personally identifiable information (e.g., PII).

One technique for obfuscating correspondence or association with personally identifiable information, yet while delivering groups of users that are similar is to generate groups of users such that (1) the users in the group have one or more characteristics in common, and (2) the users in the group do not have mutually-exclusive characteristics. Strictly as some examples, an advertiser might be interested in presenting advertisements to a group of users whom are interested in "auto". Using a retrieval mechanism such as a query to a database, the set of all users who have expressed interest in "auto" can be a starting point, however, to satisfy the aforementioned aspect of having only users in the group that do not have mutually-exclusive characteristics, some users might be excluded. Some examples of mutually-exclusive characteristics include: (a) gender, (b) income bracket, (c) marital status, etc. When delivering groups of users that are similar, some users might be excluded due to the presence of mutually-exclusive attributes, and even when a group of users do not have any mutually-exclusive characteristics, the group makeup can be made even more similar by including users that share still more characteristics in common (e.g., geographic region). The present disclosure shows and discusses how to use a rulebase to exclude some users from a group, and further discusses how to use a rulebase to include some users. By selecting a greater number of rules, and/or by increasing the specificity of a given rule, and/or by requiring certain attributes that have a low incidence of occurrence to be present, it is possible to decrease the randomness of the grouping. By selecting a lesser number of rules, and/or by decreasing the specificity of a rule, and/or by requiring certain attributes that have a high incidence of occurrence to be present, it is possible to increase the randomness of the grouping. Randomness can be tuned to a point on a randomness spectrum. Such tuning can be in response to a command, and/or a specification, and/or in response to a set of privacy requirements. A first group can have a first degree of randomness, and a second group can have a second degree of randomness.

Application of the herein-disclosed techniques serves to form groups of users where (1) the groups are sufficiently large so as to obfuscate correspondence or associations between the NPII and any personally identifiable information, (2) the members of the group do not have any mutually-exclusive attributes with respect to other members of the group, and (3) the members of the group may have additional similarities beyond the associations between the NPII and any personally identifiable information.

The present disclosure provides an improved method, system, and computer program product suited to address the aforementioned challenges and problems. More specifically, the present disclosure provides a detailed description of techniques used in methods, systems, and computer program products for associating anonymous information with personally identifiable information without sharing personally identifiable information. The claimed embodiments address the problem of sharing information about a user without identifying the user to whom the information pertains. More specifically, some claims are directed to approaches for using a private ID to associate personally identifiable information with non-personally identifiable information and grouping the IDs such that no personally identifiable information is compromised, which claims advance the technical fields for addressing the problem of sharing information about a user without identifying the user to whom the information pertains, as well as advancing peripheral technical fields. Some claims improve the functioning of multiple systems within the disclosed environments.

In one embodiment, the present disclosure describes methods, systems, and computer program products that enable a third party to send PII to a PII owner (e.g., website publisher, etc.) from which a private ID (e.g., hash tag, or other obfuscated user identifier) can be generated. The private ID is then shared with an NPII owner (e.g., user data aggregator). The NPII owner associates (e.g., in a cookie) the private ID with collected NPII. The private ID and associated NPII are grouped with the NPII of other users or ID profiles in order to obfuscate any direct association between a given ID and specific NPII attributes. The grouped NPII can then be shared by the NPII owner with the PII owner, and privacy rules, regulations, and expectations are satisfied. The PII owner can then use the additional NPII provided for the group of user IDs to deliver targeted content according to the demographic mapping and rules associated with its particular advertising campaign.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A depicts an environment 1A00 in which anonymous information is associated with personally identifiable information without sharing personally identifiable information.

As shown in FIG. 1A, the environment comprises one or more instances of a web server 112, one or more instances of a data management server 111, one or more instances of a management interface server 109, and a variety of types and instances of user devices 113 (e.g., a desktop 107, a laptop 102, an IP phone 103, a smart phone 104, a tablet 105 and/or other mobile devices 101). The aforementioned servers and devices can communicate through a wireless network 106 and/or a network 108 (e.g., a wide area network (WAN), a local area network (LAN), etc.). A protocol $120_1$ depicts operations and communications by and among user devices, web server 112, and data management server 111. In this example, web server 112 (e.g., a partner's web server)

is associated with an owner and/or user of personally identifiable information (PII) (e.g., a partner, a website publisher, a brand owner, an advertiser, a user data consumer, etc.). Data management server 111 is associated with an owner and/or user of non-personally identifiable information (NPII) (e.g., user data aggregator, user data supplier, etc.). The aforementioned servers and devices in environment 1A00 are configured to facilitate user activities at user device 113, including browsing (e.g., see browsing activity operation 132), and so as to complete an online form (e.g., in an authenticated state), which form may request or require various forms of personally identifiable information (e.g., an email address). User device 113 can then send PII (see message 134) to web server 112. Web server 112 can in turn generate a private ID (e.g., hash tag) associated with any portions or combinations of the sent PII (e.g., see operation 136). Web server 112 can then share the private ID (see message 138) with data management server 111. In another example, the private ID can be shared when a user is receiving communications (e.g., email) via an addressable digital channel. In yet another example, the private ID can be shared with a data consumer (e.g., a partner) via any known communication technique (e.g., including offline techniques) and the partner can prosecute marketing campaigns such as in-store and/or coupon mailer campaigns.

Continuing with the discussion of FIG. 1A, the data management server 111 can add the generated private ID (see operation 140) to a group of other IDs based on some NPII (e.g., partial IP address). Data management server 111 can also associate the private ID with a user cookie (see operation 142) and set or update the cookie at user device 113. The association of the ID with NPII (e.g., cookie) can be made even when there is no transfer of PII in making the association.

Once the association is complete, web server 112 (e.g., the PII owner) has its own PII and the generated private ID (e.g., hashed PII). Also, the data management server 111 (e.g., the NPII owner) has (and/or can access) the private ID (e.g., hashed PII) and NPII (e.g., cookie). Subsequent communication between the PII owner and NPII owner can happen using the private ID. For example, as shown by protocol 120$_1$, the user may continue to browse a web page at user device 113, allowing data management server 111 to capture additional NPII. Data management server 111 can use the new NPII to select and/or modify a relevant group of user NPII (e.g., see operation 146) to then share (e.g., see message 147$_1$) with web server 112. The NPII that is shared is a cumulative NPII collection from a group of IDs that includes the private ID for the browsing user. The grouping serves to prevent the web server 112 or a user of the web server 112 from knowing whether the data it has received was the result of data directly collected from the browsing user or indirectly collected (e.g., as a result of the browsing user being a part of the group). Using the grouped NPII, targeted content for the browsing user can then be determined at web server 112 according to the demographic mapping and rules associated with the particular advertising campaign. The targeted content is then delivered by web server 112 to user device 113 for viewing (e.g., see operation 148) by the browsing user.

Figure 1B:
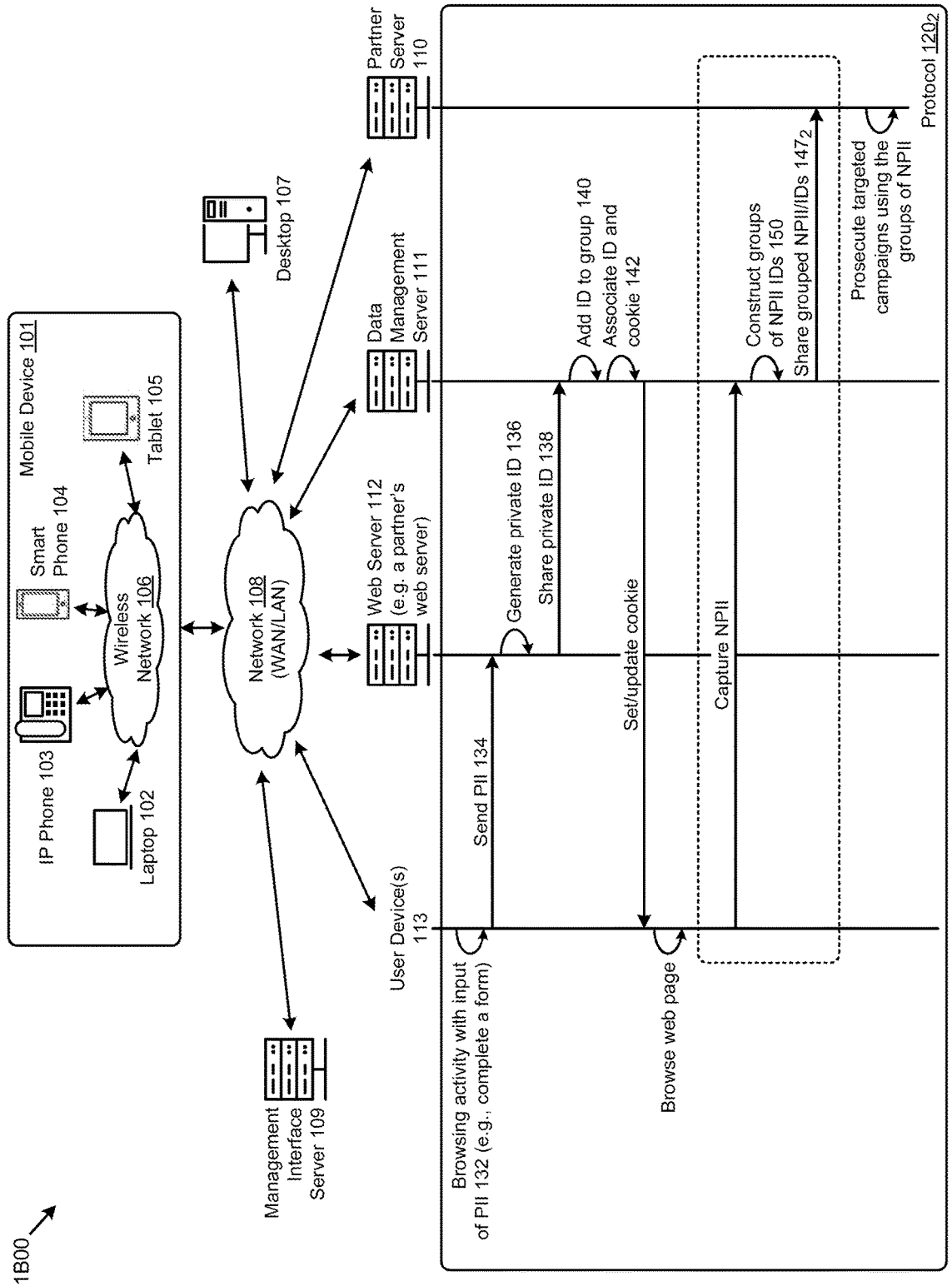
FIG. 1B depicts an environment in which information is shared with a partner without sharing personally identifiable information, according to one embodiment.

FIG. 1B depicts an environment 1B00 in which information is shared with a partner without sharing personally identifiable information. The discussion of FIG. 1A includes an example, where the private ID (e.g., obfuscated IDs) can be shared with partner and, using the private ID, the partner can prosecute marketing campaigns such as in-store and/or coupon campaigns, etc.

As shown in protocol 120$_2$, a data management server 111 can use the new NPII to construct and/or modify a relevant group of user's NPII (e.g., see operation 150 in FIG. 1B and see operation 146 in FIG. 1A) to then share (e.g., see message 147$_2$) with partner server 110. The partner can use the received NPII in combination with the partner's own data so as to prosecute marketing campaigns such as in-store and/or coupon mailer campaigns, and/or any forms of digital channel and/or non-digital channel campaigns.

Further details regarding general approaches to sharing obfuscated IDs are described in U.S. application Ser. No. 14/736,614 titled "OPERATING A MATCH COOPERATIVE WITHOUT HANDLING PERSONALLY IDENTIFIABLE INFORMATION" filed on Jun. 11, 2015, which is hereby incorporated by reference in its entirety.

Figure 2A:
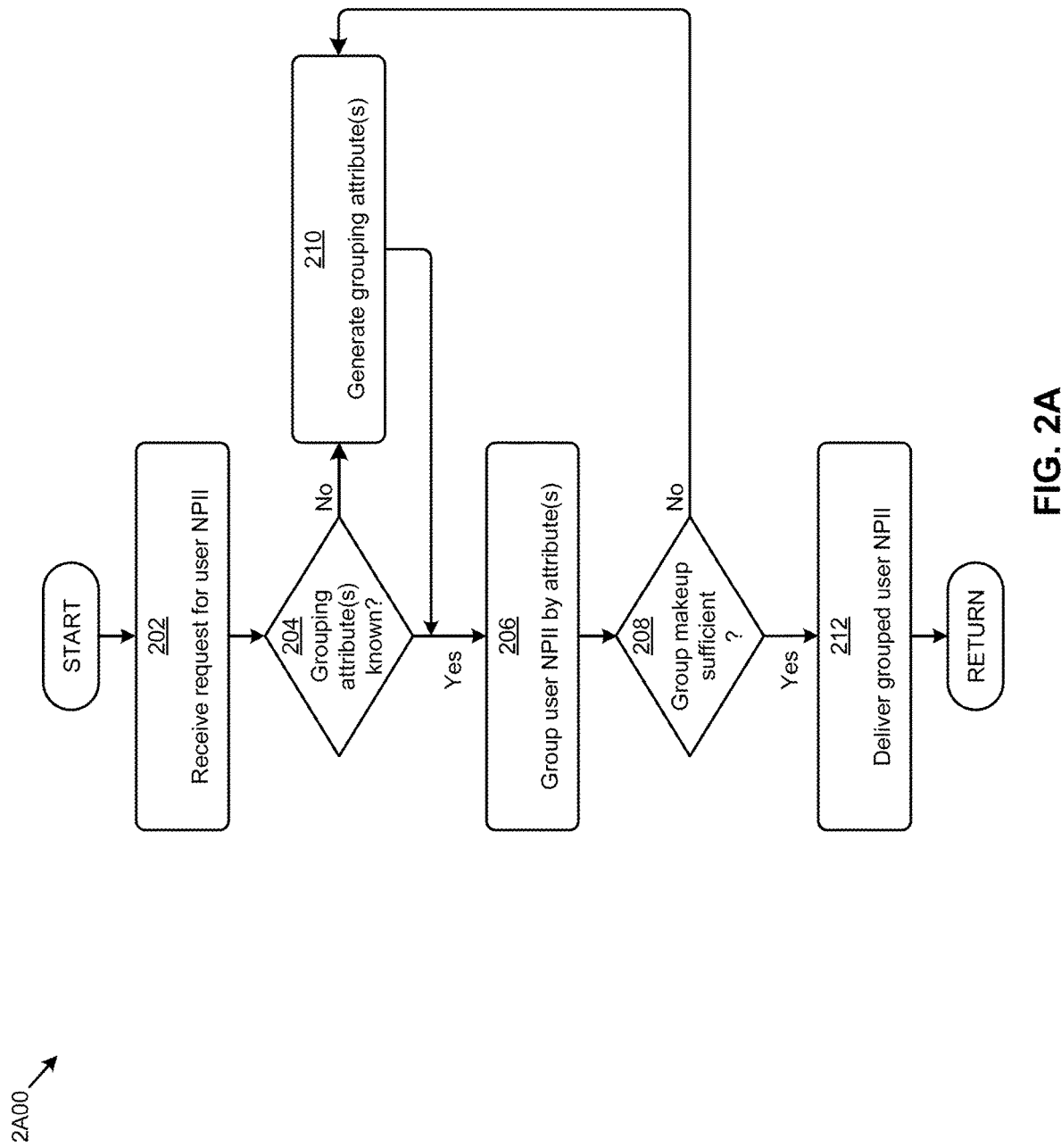
FIG. 2A is a flowchart of a method for obfuscating personally identifiable information by introducing obfuscating groupings, according to some embodiments.

FIG. 2A is a flowchart of a method 2A00 for obfuscating personally identifiable information by introducing obfuscating groupings. As an option, one or more instances of method 2A00 or any aspect thereof may be implemented in the context of the architecture and functionality of the embodiments described herein. Also, method 2A00 or any aspect thereof may be implemented in any desired environment. Further, method 2A00 can be implemented on a single server (e.g., data management server 111 of environment 1A00) or on multiple servers.

Method 2A00 serves to obfuscate user data that include PII, or an association with PII (e.g., through a private ID or tag), by grouping one or more users with other users that have one or more attributes in common (e.g., interests, partial IP address, zip+4 code, gender, age, price paid for data, etc.), and do not have any mutually-exclusive characteristics (e.g., a "male" user can have a gender assignment in common with other males, but a "male" user cannot share a gender assignment with a "female" user). The grouping will effectively add one or more indirect or "recommended" attributes to a given user's direct attributes such that each attribute is indistinguishable as to whether it is associated directly with the user or is merely recommended for the user. The overall effect of the grouping can increase user anonymity while still accurately providing user attributes (e.g., a set of marketing demographics, or a request for user NPII, or an input signal comprising users' NPII characteristics) and at the same time minimizing loss of granularity or massive collision of data.

Method 2A00 starts by receiving a request (see step 202) for user NPII. The request can be generated internally on the same server that will perform method 2A00 (e.g., data management server 111) or generated by one or more external servers (e.g., web server 112). Method 2A00 then queries whether a grouping attribute or set of attributes is known (e.g., passed to method 2A00 by the NPII request). If the attribute or attributes are not known (see test 204), method 2A00 will generate the grouping attributes, such as from a default set, or from a randomly selected set, or from a request-specific set, or from an advertiser-suggested set, etc. (see step 210). Once the attribute or attributes by which the grouping will be based are known, method 2A00 will then group the user NPII (see step 206). In some embodiments, the user information or profiles can be grouped in a single group, multiple groups, subsets of larger groups, etc. In some embodiments, the group can include a respective weight value that serves to indicate the number of users who satisfy the original request or some other parameter.

Method 2A00 then continues to determine whether the makeup (e.g., number of users in the group) is sufficient (see test 208). In some embodiments, the minimum number of users in a given group is based on a number (e.g., 7 users)

that is acceptable by privacy standards (e.g., state or federal laws or regulations), or more generally, is acceptable for maintaining anonymity of the individual users. The number of users in the group can also have a maximum limit in order to maintain the relevancy and usefulness of the grouped information as related to each user in the group. For example, using the full IP address of the user as a grouping attribute would be too specific to preserve anonymity, but using only half the IP address may be too broad to maintain relevancy of the grouped information. A portion of the IP address between the full address and half address (e.g., the first N octets) can be used to establish a group with a sufficient number (e.g., 10 users) to meet or exceed both the anonymity and relevancy criteria. Once the group is deemed sufficient, method 2A00 will then deliver the grouped user NPII (see step 212) and the process will end.

Figure 2B:
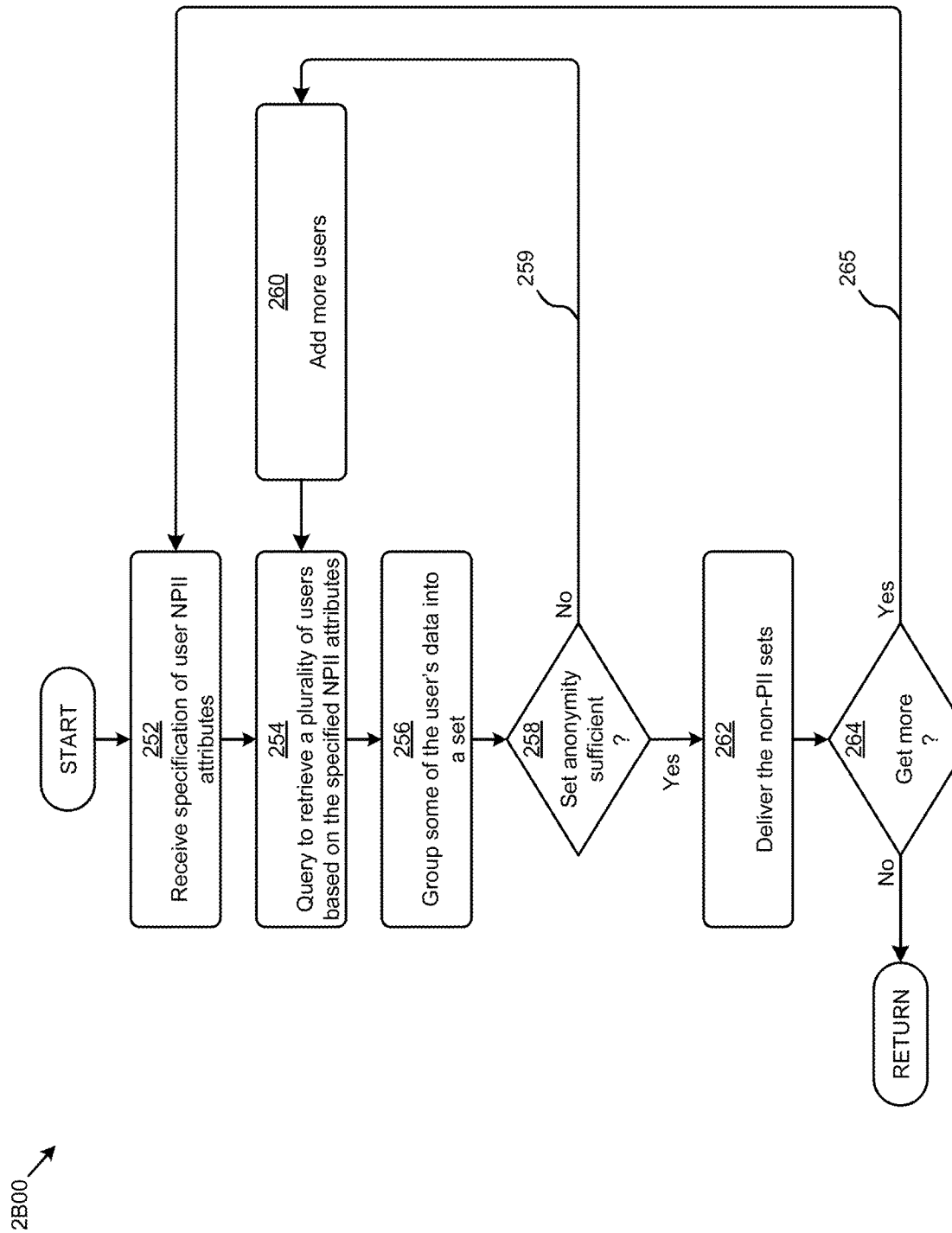
FIG. 2B is a flowchart of a method for obfuscating personally identifiable information by introducing obfuscating groupings, according to some embodiments.

FIG. 2B is a flowchart of a method 2B00 for obfuscating personally identifiable information by introducing obfuscating groupings. As an option, one or more instances of method 2B00 or any aspect thereof may be implemented in the context of the architecture and functionality of the embodiments described herein. Also, method 2B00 or any aspect thereof may be implemented in any desired environment. Further, method 2B00 can be implemented on a single server (e.g., data management server 111 of environment 1A00) or on multiple servers.

Method 2B00 serves to obfuscate user data that include PII, or an association with PII (e.g., through a private ID or tag), by grouping the users with other users that have one or more attributes in common (e.g., interests, partial IP address, zip+4 code, gender, age, price paid for data, etc.), and do not have any mutually-exclusive characteristics (e.g., a "male" user can have gender in common with other males, but a "male" user cannot share gender with a "female" user). As shown, this method 2B00 commences upon receipt of a specification of non-personally identifiable attributes (see step 252). The attributes can be used in a query (e.g., a database query) that returns users that match or are deemed in some way to correspond to the specified attributes (see step 254). The returned users are then grouped into sets that are of a sufficient size and makeup so as to obfuscate the personally-identifiable nature of the sets (see step 256). For example, the sets may contain a certain minimum number of users, or the sets may contain a certain minimum number of attributes (see decision 258, feedback loop 259). In this embodiment, the characteristic-wise fidelity of the sets can be very high since all of the selected users within a set are deemed to have at least the properties corresponding to the specification of NPII attributes. In cases when feedback loop 259 is taken, additional users are added to the plurality of users (see step 260), and an expanded selection or broader query is executed so as to identify more users that match or are deemed in some way to correspond to the specified attributes (see step 254). The method continues by delivering the non-PII sets to the requestor (see operation 262). In some embodiments the method operates continuously over incoming requests, and in such embodiments the method will test for more (see decision 264) and, if there is or might be more requests to process, then the method will loop back (see loop back 265) to receive additional input specifications.

Figure 3A:
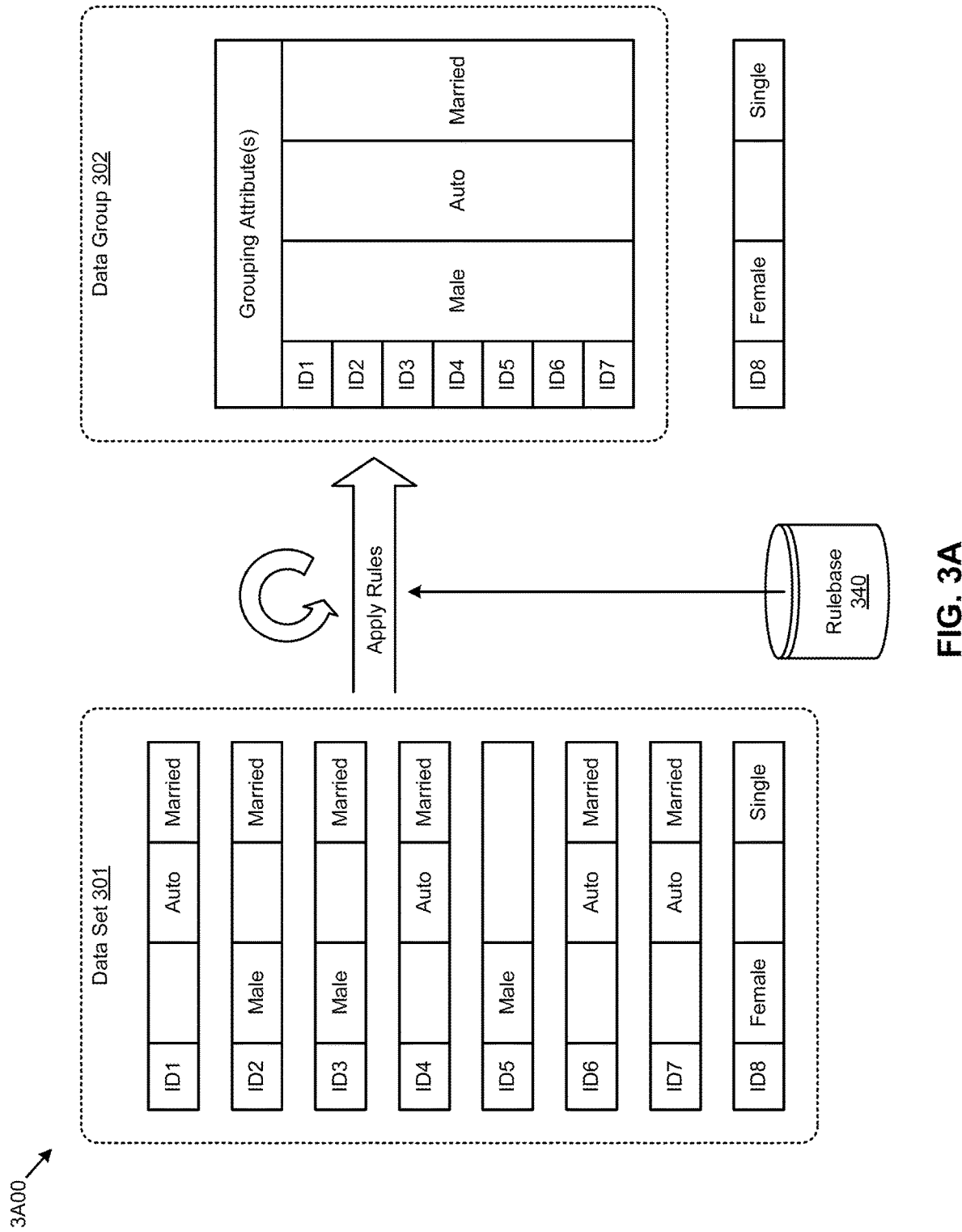
FIG. 3A presents data structures used for associating anonymous information with personally identifiable information without sharing personally identifiable information, according to some embodiments.

FIG. 3A presents data structures 3A00 used for associating anonymous information with personally identifiable information without sharing personally identifiable information. As an option, one or more instances of data structures 3A00 or any aspect thereof may be implemented in the context of the architecture and functionality of the embodiments described herein. Also, data structures 3A00 or any aspect thereof may be implemented in any desired environment.

As shown in FIG. 3A, data structures 3A00 comprise a data set 301 of associated private IDs and NPII, and a data group 302 of NPII comprising information from selected users based on specific criteria. The data group 302 can be shared without divulging the relationship of the PII to the selected users. More specifically, the data set 301 represents NPII associated with users with private IDs ID1-ID8. For example, user ID1 has an associated interest in "auto", user ID2 has an associated gender of "male", and so on. Since the data set 301 contains user records that are composed of only private IDs (e.g., a hashed or hidden PII) and NPII (e.g., male/female, auto, married/single), the data set 301 can be managed (e.g., owned, collected, controlled, etc.) by an NPII provider (e.g., the owner of data management server 111 in environment 1A00).

According to protocol $120_1$ in FIG. 1A and method 2A00 in FIG. 2A, the NPII within data set 301 is grouped before sharing it with a PII owner in order to protect the anonymity of users ID1-ID8. For example, data set 301 can be grouped as shown in data group 302. Suppose a PII owner knows that the user corresponding to ID1 is interested in "auto" and wants additional information about that user (e.g., see user shown as ID1). A data gatherer has such additional information, but cannot share it unless and until the correspondence of the additional information to personally identifiable information has been obfuscated. Specifically, by using grouping rules that serve to exclude some users from a candidate set based on mutual-exclusivity of an attribute value (e.g., gender, marital status, etc.), and by using grouping rules that serve to include some users based on similarity of an attribute value (e.g., partial IP address, zip+4 code etc.), users IDI-ID7 can be grouped together. The requestor/recipient of non-PII sets of data cannot determine whether the appearance of a particular attribute value "married" was the result of that attribute value being imputed (e.g., explicitly added) to the entire group, or whether the appearance of the attribute value "married" was a result of query, or whether the appearance of the attribute "married" was a result of an application of a heuristic rule or demographic mapping that pertains to the marital status attribute. Anonymity is preserved. Continuing this example, the requestor can use the additional information (e.g., the indication that user ID1 is married) in a targeted marketing campaign (e.g., that seeks to target only married people interested in "auto".

As shown, user ID8 was excluded from the data group 302 as a result of ID8's association with the gender "female" which is mutually-exclusive with respect to at least some of the other members of data group 302). The user ID8 might also have been excluded from the data group 302 based on her marital status of "single" which is mutually-exclusive with respect to at least some of the other member of data group 302. Regarding another feature of this example, when data group 302 is shared with a PII owner, the association of a private ID with PII may be known, but the specific or direct NPII associated with a private ID is not known. For example, only some users (e.g., ID1, ID4, ID6, and ID7 had "auto" associated with it, but all IDs within data group 302 are delivered as having "auto" associated with them such that the PII owner cannot distinguish between direct or indirect NPII associated with each ID. This anonymity is accomplished, in part, by creating a group of a sufficient size (e.g., 7 users or more). If the group is too small (e.g., users ID1, ID4, ID6, and ID7), then the NPII (e.g., "auto") can be more easily inferred or attributed to a given ID.

A rulebase 340 includes rules and rule-based heuristics that can be used for determining the makeup of groups. A rule or heuristic within a rulebase can serve to exclude a particular user from a candidate set based on approaches or heuristics to avoid comingling of users that have mutually exclusive characteristics. Or, a rule or heuristic within a rulebase can serve to include a particular user from within a relatively larger candidate set in order to form a relatively smaller candidate set. All or some rules can be applied over a data set. Rules for excluding based on mutual exclusivity can be applied first, followed by rules that include based on similarities. For example, rules that check for mutual exclusivity pertaining to demographic status (e.g., married or single, has children or no children, male or female, etc.) or demographic ranges (e.g., income bracket, age group, etc.) can be applied before rules that include based on similarities (e.g., country, state, or other geography, one or more dotted quads of an IP address, etc.). In some embodiments, the rules can be ordered into a value regime. For example, a higher-value inclusion rule might pertain to similarities between the first three of four dotted quads (e.g., highly localized), whereas a lower-value inclusion rule might pertain to similarities of country of residence (e.g., not very localized). Still more rules can be defined so as to codify marketing (or other) associations. For example, it might be known that there is a correlation between gender=male and interest=auto. Rules can be processed over fields that are unknown or neutral. For example, and again referring to the example of FIG. 3A, the user corresponding to ID5 might have been included based on ID5's similarity (e.g., "auto") to other members of data set 301, even though it is not known whether or not user ID5 is married or single.

In addition to the aforementioned techniques to exclude or include a degree anonymity of a candidate grouping can be verified. For example, and as shown in FIG. 2B, decision 258 serves to apply an anonymity measure over a particular selected set of user data. An anonymity measure can be based on a rule pertaining to the number of unique users represented in the set, or an anonymity measure can be based on a rule pertaining the specific mix of attributes, or an anonymity measure can be based on heuristics pertaining to the specific mix of attributes. Strictly as one possible rule example, an anonymity measure based on a rule pertaining to the specific mix of attributes might disallow inclusion of a particular attribute when that particular attribute is marked so as to be explicitly excluded from use when forming sets of non-personally identifiable information. Strictly as one possible heuristic example, an anonymity measure based on a rule pertaining the specific mix of attributes might disallow inclusion of a particular attribute when the total number of users sharing that attribute is statistically small. Strictly as another possible example, a rule pertaining to the specific mix of attributes might enforce inclusion of a particular attribute into a plurality of sets of data. Heuristics can be implemented as one or more rules in the rulebase. In some cases, rules are selected and processed in a particular order so as to first process exclusion rules that deemed likely to exclude a large proportion of a data set (e.g., male versus female might exclude half of a randomly-selected data set), followed by processing exclusion rules that are likely to exclude a smaller proportion of a data set (e.g., mutual exclusion by a 5-tier income bracket attribute might only exclude one fifth of a randomly-selected data set).

The rulebase 340 is handled "in secret" (e.g., it is not made available outside of the system) such that a recipient of the non-PII sets cannot use the rulebase to discern personally identifiable information from the delivered sets of data. More specifically, in absence of the rulebase 340, a recipient of the non-PII sets of data cannot determine whether the appearance of the attribute value "male" was the result of that attribute value being imputed (e.g., explicitly added) to the entire group, or whether the appearance of the attribute value "male" was a result of query, or whether the appearance of the attribute "male" was a result of application of a heuristic rule or demographic mapping that pertains to the gender attribute.

In exemplary cases, copies of the rulebase 340 are encrypted to as to further protect the anonymity of any user. The shown rulebase 340 and user database 380 can be accessed (e.g., for selection and retrieval of user records) using a database access module 310.

The PII owner can use data group 302 to present targeted content to select users for a given advertising campaign. For example, auto-related content (e.g., a banner ad) can be sent to one or more of users ID1-ID7 based on the users' current browsing activity.

Figure 3B:
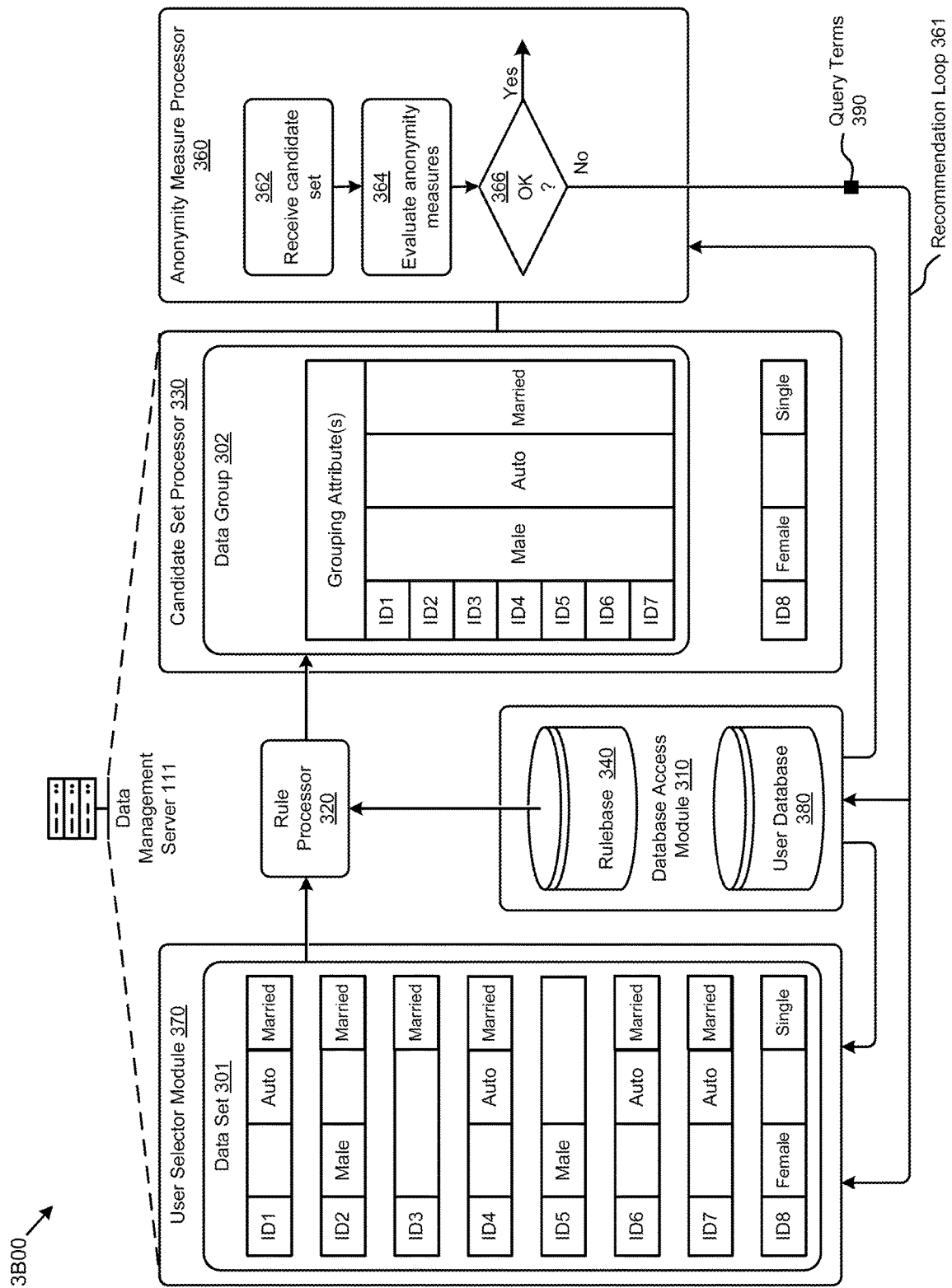
FIG. 3B presents a system for associating anonymous information with personally identifiable information without sharing personally identifiable information, according to some embodiments.

FIG. 3B presents a system for associating anonymous information with personally identifiable information without sharing personally identifiable information. As an option, one or more instances of system 3B00 or any aspect thereof may be implemented in the context of the architecture and functionality of the embodiments described herein. Also, system 3B00 or any aspect thereof may be implemented in any desired environment.

As shown, the system comprises a rule processor 320 that processes user data (e.g., see data set 301) in conjunction with a rulebase 340. The application of the rules serve to implement certain inclusion and/or exclusion rules and/or heuristics so as to generate a data group 302 that associates anonymous information with personally identifiable information without sharing personally identifiable information. The data group 302 that results from the rule processor 320 can be further processed (e.g., by the shown candidate set processor 330) so as to evaluate the specific data group for anonymity. In some embodiments, an anonymity measure processor 360 is configured to receive a candidate set (see operation 362), then evaluation one or more anonymity measures (see operation 364), and to determine (see decision 366) if the degree of anonymity (e.g., based on quantifiable metrics such as anonymity measures) satisfy a particular threshold.

In some embodiments, an anonymity measure processor 360 is used to make recommendations through a recommendation loop 361 so as to effect changes to the selection process of user selector module 370, and/or to effect changes to be made to the query, and/or to effect changes to be made as pertains to rule selection and/or application. In some cases, data is passed in the recommendation loop, and such data can include query terms 390 as are recommended by the anonymity measure processor 360. The query terms 390 can include terms to eliminate from a next query so as to retrieve more users to place into a data set such as data set 301, and thereby improving the likelihood of generating a sufficiently anonymous candidate group (e.g., data group 302).

Calculating an anonymity measure of a candidate group (e.g., data group 302) can include calculating a number of user records in the candidate group, calculating the number of attributes, calculating the occurrence of a particular attribute or attribute value in a large population of users, and/or performing any anonymity tests (e.g., value tests) to quantify the anonymity against a threshold value (e.g., determining that the anonymity measure satisfies a threshold of anonymity).

Additional Embodiments of the Disclosure

Additional Practical Application Examples

FIG. 4A1 is a block diagram of a system 4A100 for implementing all or portions of any of the embodiments described herein. As an option, one or more instances of system 4A100 or any aspect thereof may be implemented in the context of the architecture and functionality of the embodiments described herein. Also, system 4A100 or any aspect thereof may be implemented in any desired environment.

The system 4A100 comprises at least one processor and at least one memory, the memory serving to store program instructions corresponding to the operations of the system. As shown, an operation can be implemented in whole or in part using program instructions accessible by a module. The modules are connected to a communication path 4A105, and any operation can communicate with other operations over communication path 4A105. The modules of the system can, individually or in combination, perform method operations within system 4A100. Any operations performed within system 4A100 may be performed in any order unless as may be specified in the claims.

The shown embodiment implements a portion of a computer system, shown as system 4A100, comprising a computer processor to execute a set of program code instructions (see module 4A110) and modules for accessing memory to hold program code instructions to perform: receiving a request for user NPII (e.g., in the form of a specification record) comprising one or more user grouping attributes to be used in a database query operation (see module 4A120); performing the database query operation over a first plurality of user records to retrieve selected user records, the selected user records having at least some of the one or more user grouping attributes (see module 4A130); and forming an anonymous group of a number of user records composed of a plurality of individual user records taken from the selected user records, wherein the anonymous group does not comprise individual user records that do not share the same grouping attributes (see module 4A140).

In FIG. 4A2, the system 4A200 comprises at least one processor and at least one memory, the memory serving to store program instructions corresponding to the operations of the system. As shown, an operation can be implemented in whole or in part using program instructions executed by a processor (see module 4A250) accessible by any other modules. The modules are connected to a communication path 4A205, and any operation can communicate with other operations over communication path 4A205. The modules of the system can, individually or in combination, perform method operations within system 4A200. Any operations performed within system 4A200 may be performed in any order unless as may be specified in the claims.

In some embodiments, the program instructions comprise program code for: receiving at a first server personally identifiable information associated with a plurality of identifiable users, wherein each identifiable user is associated with a unique set of personally identifiable information (see module 4A255); receiving at a second server non-personally identifiable information associated with a plurality of anonymous users, wherein each anonymous user is associated with at least one set of non-personally identifiable information (see module 4A260); generating at first server a plurality of unique private identifiers, wherein each private identifier represents one unique set of personally identifiable information (see module 4A265); transmitting one or more unique private identifiers from the first server to the second server (see module 4A270); associating at the second server one or more unique private identifiers with one or more sets of non-personally identifiable information (see module 4A275); determining at the second server a group of user information, wherein each group of user information comprises a number of unique private identifiers and the sets of non-personally identifiable information associated with each unique private identifier (see module 4A280); and transmitting one or more groups of user information from the second server to the first server (see module 4A285).

Figure 4B:
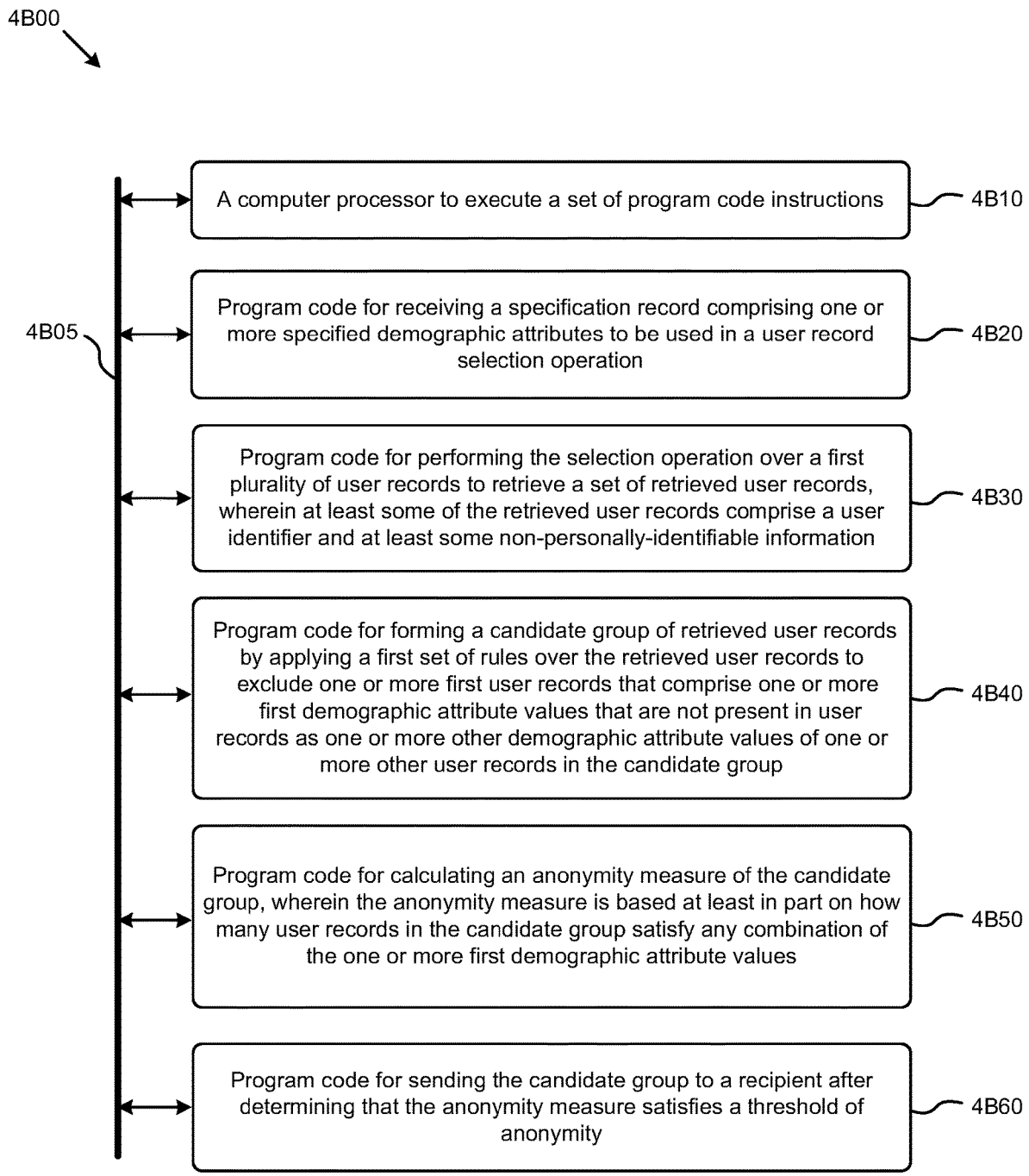

FIG. 4B depicts a system 4B00 as an arrangement of computing modules that are interconnected so as to operate cooperatively to implement certain of the herein-disclosed embodiments. The partitioning of system 4B00 is merely illustrative and other partitions are possible. As an option, the present system 4B00 may be implemented in the context of the architecture and functionality of the embodiments described herein. Of course, however, the system 4B00 or any operation therein may be carried out in any desired environment. The system 4B00 comprises at least one processor and at least one memory, the memory serving to store program instructions corresponding to the operations of the system. As shown, an operation can be implemented in whole or in part using program instructions accessible by a module. The modules are connected to a communication path 4B05, and any operation can communicate with other operations over communication path 4B05. The modules of the system can, individually or in combination, perform method operations within system 4B00. Any operations performed within system 4B00 may be performed in any order unless as may be specified in the claims. The shown embodiment implements a portion of a computer system, presented as system 4B00, comprising a computer processor to execute a set of program code instructions (see module 4B10) and modules for accessing memory to hold program code instructions to perform: receiving a specification record comprising one or more specified demographic attributes to be used in a user record selection operation (see module 4B20); performing the selection operation over a first plurality of user records to retrieve a set of retrieved user records, wherein at least some of the retrieved user records comprise a user identifier and at least some non-personally-identifiable information (see module 4B30); forming a candidate group of retrieved user records by applying a first set of rules over the retrieved user records to exclude one or more first user records that comprise one or more first demographic attribute values that are not present in any same user records as one or more other demographic attribute values of one or more other user records in the candidate group (see module 4B40); calculating an anonymity measure of the candidate group, wherein the anonymity measure is based at least in part on how many user records in the candidate group satisfy any combination of the one or more first demographic attribute values (see module 4B50); and sending the candidate group to a recipient after determining that the anonymity measure satisfies a threshold of anonymity (see module 4B60).

System Architecture Overview

Additional System Architecture Examples

Figure 5A:
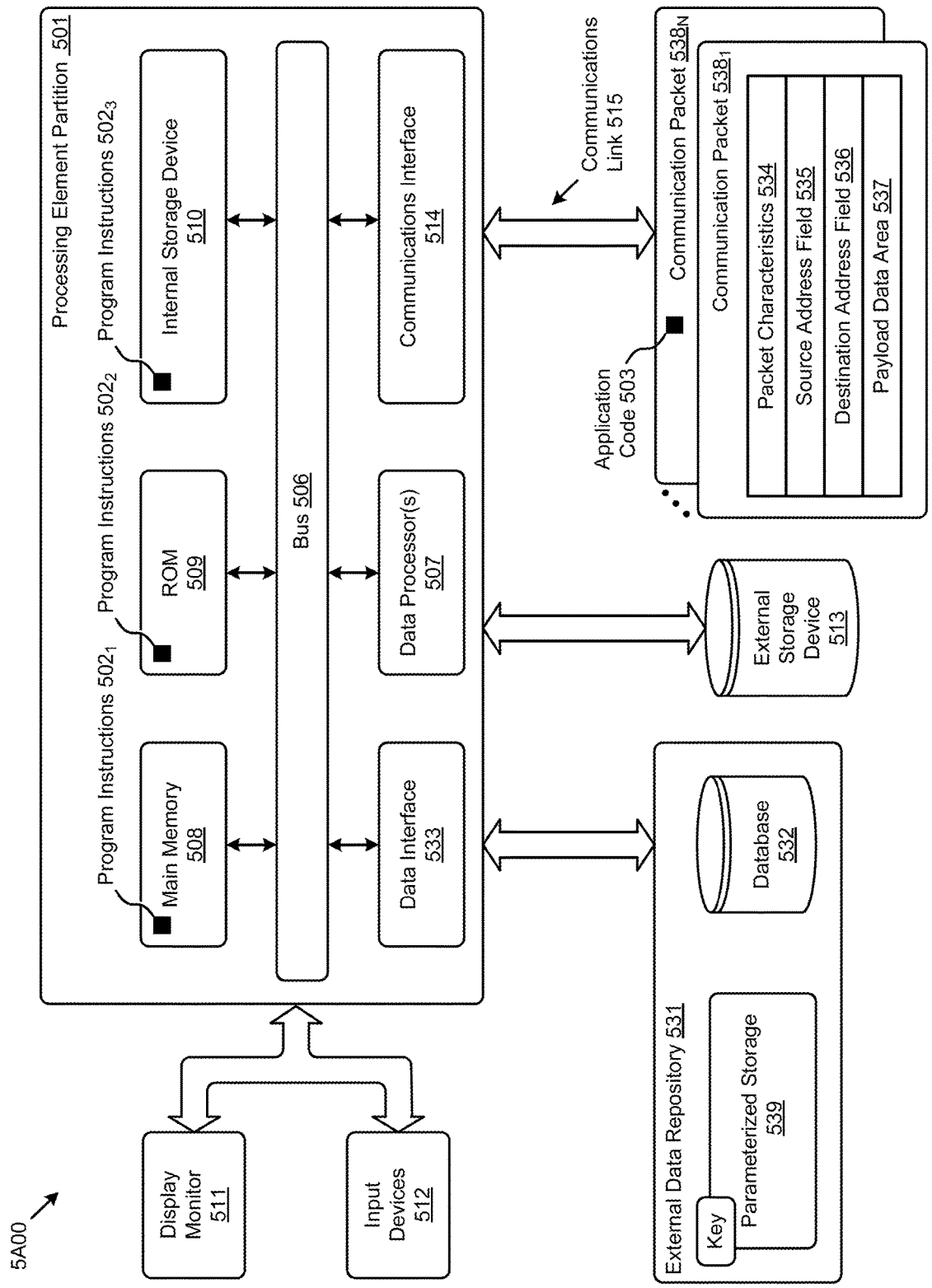
FIG. 5A, FIG. 5B, and FIG. 5C depict exemplary architectures of components suitable for implementing embodiments of the present disclosure and/or for use in the herein-described environments.

FIG. 5A depicts a block diagram of an instance of a computer system 5A00 suitable for implementing embodiments of the present disclosure. Computer system 5A00 includes a bus 506 or other communication mechanism for communicating information. The bus interconnects subsystems and devices such as a CPU, or a multi-core CPU (e.g., data processor 507), a system memory (e.g., main memory 508, or an area of random access memory (RAM)), a non-volatile storage device or non-volatile storage area (e.g., read-only memory 509), an internal storage device 510 or external storage device 513 (e.g., magnetic or optical), a data interface 533, a communications interface 514 (e.g., PHY, MAC, Ethernet interface, modem, etc.). The aforementioned components are shown within processing element partition 501, however other partitions are possible. The shown computer system 5A00 further comprises a display 511 (e.g., CRT or LCD), various input devices 512 (e.g., keyboard, cursor control), and an external data repository 531.

According to an embodiment of the disclosure, computer system 5A00 performs specific operations by data processor 507 executing one or more sequences of one or more program code instructions contained in a memory. Such instructions (e.g., program instructions 502$_1$, program instructions 502$_2$, program instructions 502$_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 5A00 performs specific networking operations using one or more instances of communications interface 514. Instances of the communications interface 514 may comprise one or more networking ports that are configurable (e.g., pertaining to speed, protocol, physical layer characteristics, media access characteristics, etc.) and any particular instance of the communications interface 514 or port thereto can be configured differently from any other particular instance. Portions of a communication protocol can be carried out in whole or in part by any instance of the communications interface 514, and data (e.g., packets, data structures, bit fields, etc.) can be positioned in storage locations within communications interface 514, or within system memory, and such data can be accessed (e.g., using random access addressing, or using direct memory access DMA, etc.) by devices such as data processor 507.

The communications link 515 can be configured to transmit (e.g., send, receive, signal, etc.) any types of communications packets (e.g., communications packets 538$_1$ through communications packets 538$_N$) comprising any organization of data items. The data items can comprise a payload data area 537, a destination address 536 (e.g., a destination IP address), a source address 535 (e.g., a source IP address), and can include various encodings or formatting of bit fields to populate the shown packet characteristics 534. In some cases the packet characteristics include a version identifier, a packet or payload length, a traffic class, a flow label, etc. In some cases the payload data area 537 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 507 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 531, which in turn can be formatted into any one or more storage areas, and which can comprise parameterized storage 539 accessible by a key (e.g., filename, table name, block address, offset address, etc.).

Execution of the sequences of instructions to practice certain embodiments of the disclosure are performed by a single instance of the computer system 5A00. According to certain embodiments of the disclosure, two or more instances of computer system 5A00 coupled by a communications link 515 (e.g., LAN, PTSN (public switched telephone network), or wireless network) may perform the sequence of instructions required to practice embodiments of the disclosure using two or more instances of components of computer system 5A00.

The computer system 5A00 may transmit and receive messages such as data and/or instructions organized into a data structure (e.g., communications packets). The data structure can include program instructions (e.g., application code 503), communicated through communications link 515 and communications interface 514. Received program code may be executed by data processor 507 as it is received and/or stored in the shown storage device or in or upon any other non-volatile storage for later execution. Computer system 5A00 may communicate through a data interface 533 to a database 532 on an external data repository 531. Data items in a database can be accessed using a primary key (e.g., a relational database primary key).

The processing element partition 501 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 507. Some embodiments include one or more special-purpose hardware components (e.g., power control, logic, sensors, transducers, etc.). A module may include one or more state machines and/or combinational logic used to implement or facilitate the operational and/or performance characteristics of associating anonymous information with personally identifiable information in a non-identifiable manner.

Various implementations of the database 532 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate techniques for associating anonymous information with personally identifiable information in a non-identifiable manner. Such files or records can be brought into and/or stored in volatile or non-volatile memory.

Figure 5B:
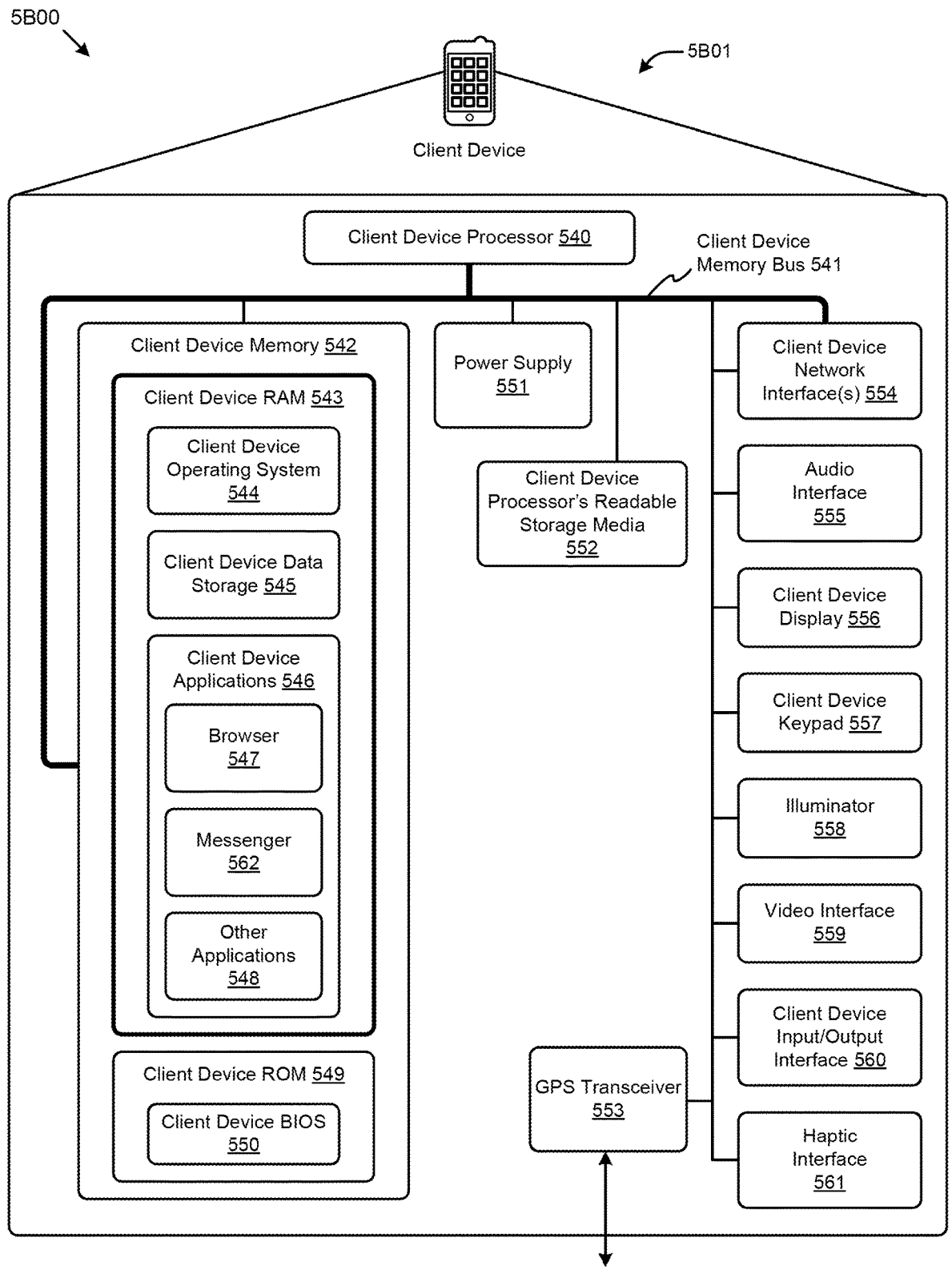

FIG. 5B depicts a block diagram 5B00 of an instance of a client device 5B01 that may be included in a system implementing instances of the herein-disclosed embodiments. Client device 5B01 may include many more or fewer components than those shown in FIG. 5B. Client device 5B01 may represent, for example, an embodiment of at least one of client devices as heretofore disclosed.

As shown in the figure, client device 5B01 includes a client device processor 540 in communication with a client device memory 542 via a client device memory bus 541. Client device 5B01 also includes a power supply 551, one or more client device network interfaces 554, an audio interface 555, a client device display 556, a client device keypad 557, an illuminator 558, a video interface 559, a client device 10 interface 560, a haptic interface 561, and a GPS transceiver 553 for global positioning services.

The power supply 551 provides power to client device 5B01. A rechargeable or non-rechargeable battery may be used to provide power. The power may also be provided by an external power source such as an AC adapter or a powered docking cradle that supplements and/or recharges a battery.

A client device 5B01 may optionally communicate with a base station, or directly with another computing device. A client device network interface 554 includes circuitry for coupling a client device 5B01 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), short message service (SMS), general packet radio service (GPRS), wireless access protocol (WAP), ultra-wide band (UWB), IEEE 802.16 Worldwide Interoperability for Microwave Access (WiMax), session initiated protocol/real-time transport protocol (SIP/RTP), or any of a variety of other wireless communication protocols. A client device network interface is sometimes known as a transceiver, a transceiving device, or a network interface card (NIC).

An audio interface 555 is arranged to produce and receive audio signals such as the sound of a human voice. For example, audio interface 555 may be coupled to a speaker and microphone to enable telecommunication with others and/or generate an audio acknowledgement for some action.

A client device display 556 may be a liquid crystal display (LCD), gas plasma, light emitting diode (LED), or any other type of display used with a computing device. A client device display 556 may also include a touch sensitive screen arranged to receive input from an object such as a stylus or a digit from a human hand.

A client device keypad 557 may comprise any input device arranged to receive input from a user. For example, client device keypad 557 may include a push button numeric dial, or a keyboard. A client device keypad 557 may also include command buttons that are associated with selecting and sending images.

An illuminator 558 may provide a status indication and/or provide light. Illuminator 558 may remain active for specific periods of time or in response to events. For example, when the illuminator 558 is active, it may backlight the buttons on client device keypad 557 and stay on while the client device is powered. Also, the illuminator 558 may backlight these buttons in various patterns when particular actions are performed such as dialing another client device. An illuminator 558 may also cause light sources positioned within a transparent or translucent case of the client device to illuminate in response to actions.

A video interface 559 is arranged to capture video images such as a still photo, a video segment, an infrared video or the like. For example, the video interface 559 may be coupled to a digital video camera, a web-camera or the like. A video interface 559 may comprise a lens, an image sensor, and other electronics. Image sensors may include a complementary metal-oxide-semiconductor (CMOS) integrated circuit, charge-coupled device (CCD), or any other integrated circuit for sensing light.

Some instances of the shown client device 5B01 comprise a client device IO interface 560 for communicating with external devices such as a headset, or other input or output devices not shown in FIG. 5B. The client device IO interface 560 can use one or more communication technologies such as a USB, infrared, Bluetooth™ port or the like. A haptic interface 561 is arranged to as a human interface device (HID) to facilitate interaction with a user of a client device. Such interaction can include tactile feedback to a user of the client device. For example, the haptic interface 561 may be employed to cause vibration of the client device 5B01 in a particular way (e.g., with a pattern or periodicity) and/or when interacting with one or another user.

A GPS transceiver 553 can determine the physical coordinates of client device 5B01 on the surface of the Earth. The GPS transceiver 553, in some embodiments, may be optional. The shown GPS transceiver 553 outputs a location such as a latitude value and a longitude value. However, the GPS transceiver 553 can also employ other geo-positioning mechanisms including, but not limited to, triangulation, assisted GPS (AGPS), enhanced observed time difference (E-OTD), cell identifier (CI), service area identifier (SAI), enhanced timing advance (ETA), base station subsystem (BSS) or the like, to determine the physical location of client device 5B01 on the surface of the Earth. It is understood that under different conditions, a GPS transceiver 553 can determine a physical location within millimeters for client device 5B01; and in other cases, the determined physical location may be less precise such as within a meter or significantly greater distances. In certain embodiments, the client device 5B01 may provide other information that may be employed to determine a physical location of the device including, for example, a media access control (MAC) address, IP address, IP port identifier, or the like.

The client device memory 542 includes random access memory 543, read-only memory 549, and other computer-readable storage. The client device memory 542 illustrates an example of computer readable storage media (devices)

for storage of information such as computer readable instructions, data structures, program modules or other data. The client device memory 542 stores a basic IO system (BIOS) in the embodiment of client device BIOS 550 for controlling low-level operation of client device 5B01. The memory also stores an operating system 544 for controlling the operation of client device 5B01. It will be appreciated that this component may include a general-purpose operating system such as a version of UNIX, or LINUX™, or a specialized client communication operating system such as Microsoft Corporation's Windows Mobile™ Apple Corporation's iOS™, Google Corporation's Android™, or the Symbian® operating system. The operating system may include or interface with a Java virtual machine module that enables control of hardware components and/or operating system operations via Java application programs.

The client device memory 542 further includes one or more instances of client device data storage 545, which can be used by client device 5B01 to store, among other things, client device applications 546 and/or other data. For example, client device data storage 545 may also be employed to store information that describes various capabilities of client device 5B01. The information may then be provided to another device based on any of a variety of events including being sent as part of a header during a communication, sent upon request or the like. Client device data storage 545 may also be employed to store social networking information including address books, buddy lists, aliases, user profile information or the like. Further, client device data storage 545 may also store messages, web page content, or any of a variety of content (e.g., received content, user generated content, etc.).

At least a portion of the information may also be stored on any component or network device including, but not limited, to a client device processor's readable storage media, a disk drive or other computer readable storage devices within client device 5B01, etc.

An instance of a client device processor's readable storage media 552 may include volatile, nonvolatile, removable, and non-removable media implemented in any method or technology for storage of information such as computer- or processor-readable instructions, data structures, program modules, or other data. Examples of computer readable storage media include RAM, ROM, electrically erasable programmable read-only memory (EEPROM), flash memory or other memory technology, Compact disc read-only memory (CD-ROM), digital versatile disks (DVD) or other optical storage, magnetic cassettes, magnetic tape, magnetic disk storage or other magnetic storage devices, or any other physical medium which can be used to store information and which can be accessed by a computing device. The aforementioned readable storage media may also be referred to herein as computer readable storage media.

The client device applications 546 may include computer executable instructions which, when executed by client device 5B01, transmit, receive, and/or otherwise process network data. The network data may include, but is not limited to, messages (e.g., SMS, multimedia message service (MMS), instant message (IM), email, and/or other messages), audio, video, and enable telecommunication with another user of another client device. Client device applications 546 may include, for example, a messenger 562, a browser 547, and other applications 548. Certain instances of other applications 548 may include, but are not limited to, calendars, search programs, email clients, IM applications, SMS applications, voice over Internet protocol (VOIP) applications, contact managers, task managers, transcoders, database programs, word processing programs, security applications, spreadsheet programs, games, search programs, and so forth. In some embodiments, the applications may collect and store user data that may be received from other computing devices in the environment.

A messenger 562 may be configured to manage a messaging session using any of a variety of messaging communications including, but not limited to email, SMS, IM, MMS, internet relay chat (IRC), Microsoft IRC (mIRC), really simple syndication (RSS) feeds, and/or the like. For example, in certain embodiments, the messenger 562 may be configured as an IM application such as AOL (America Online) instant messenger, Yahoo! messenger, .NET messenger server, ICQ or the like. In certain embodiments, the messenger 562 may be configured to include a mail user agent (MUA) such as Elm, Pine, message handling (MH), Outlook, Eudora, Mac Mail, Mozilla Thunderbird or the like. In another embodiment, the messenger 562 may be a client device application that is configured to integrate and employ a variety of messaging protocols including, but not limited, to various push and/or pull mechanisms for client device 5B01. In certain embodiments, the messenger 562 may interact with the browser 547 for managing messages. As used herein, the term "message" refers to any of a variety of messaging formats, or communications form including, but not limited to, email, SMS, IM, MMS, IRC or the like.

A browser 547 may include virtually any application configured to receive and display graphics, text, multimedia, messages and the like, employing virtually any web based language. In certain embodiments, the browser application is enabled to employ HDML, WML, WMLScript, JavaScript, SGML, HTML, XML and the like, to display and send a message. However, any of a variety of other web-based programming languages may be employed. In certain embodiments, a browser 547 may enable a user of client device 5B01 to communicate with another network device as may be present in the environment.

Figure 5C:
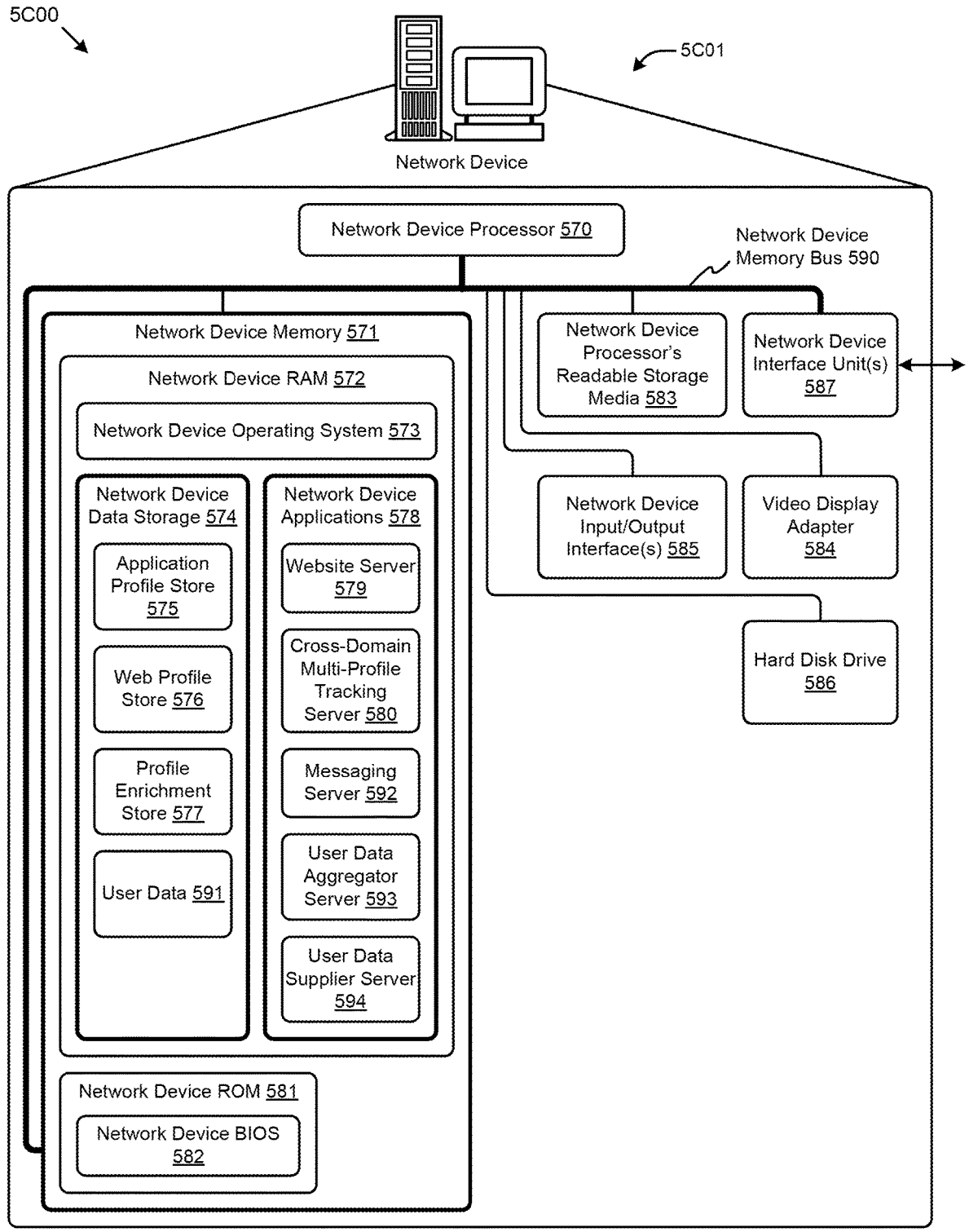

FIG. 5C depicts a block diagram 5C00 of an instance of a network device 5C01 that may be included in a system implementing instances of the herein-disclosed embodiments. Network device 5C01 may include many more or fewer components than those shown. Network device 5C01 may be configured to operate as a server, client, peer, a host, or any other device.

The network device 5C01 includes at least one instance of a network device processor 570, instances of readable storage media, one or more instances of a network interface unit 587, a network device IO interface 585, a hard disk drive 586, a video display adapter 584, and a network device memory 571, all in communication with each other via a network device memory bus 590. The network device memory generally includes network device RAM 572, network device ROM 581. Some embodiments include one or more non-volatile mass storage devices such as a hard disk drive 586, a tape drive, an optical drive, and/or a floppy disk drive. The network device memory stores a network device operating system 573 for controlling the operation of network device 5C01. Any general-purpose operating system may be employed. A basic input/output system (BIOS) is also provided in the form of network device BIOS 582 for controlling the low-level operation of network device 5C01. As illustrated in FIG. 5C, a network device 5C01 also can communicate with the Internet, or some other communications network, via a network interface unit 587, which is constructed for use with various communication protocols including the TCP/IP protocol. A network interface unit 587 is sometimes known as a transceiver, a transceiving device, or a network interface card (NIC). Network device 5C01 also comprises a network device IO interface 585 for communicating with external devices such as a keyboard or other input or output devices. A network device IO interface 585 can use one or more communication technologies such as USB, infrared, Bluetooth™ or the like.

The storage devices as described above may use various types of computer readable media, namely tangible forms of non-volatile computer readable storage media and/or a client device processor's readable storage media 552 and/or a network device processor's readable storage media 583. Such media may include any combinations of volatile, nonvolatile, removable, and non-removable media implemented in any method or technology for storage of information such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store information and which can be accessed by a computing device.

As shown, network device data storage 574 may include a database, text storage, a spreadsheet, a folder or directory hierarchy, a file or files or the like that may be configured to maintain and store user account identifiers, user profiles, email addresses, IM addresses, and/or other network addresses or the like. Network device data storage 574 may further include program code, data, algorithms and the like, for use by a processor such as a network device processor 570 to execute and perform actions. In certain embodiments, at least some of the logical contents of network device data storage 574 might be stored on another component of network device 5C01 such as on a second instance of hard disk drive 586 or on an external/removable storage device.

The network device data storage 574 may further store any portions of application data and/or user data such as an application profile store 575, a web profile store 576, a profile enrichment store 577 and/or any user data collected. In some embodiments, user data 591 may store unique user data, non-unique user data, aggregated user data, and/or any combination thereof. User data 591 may include a variety of attributes such as a five digit zip code, an expanded nine digit zip code and the like.

The Network device data storage 574 may also store program code and data. One or more network device applications 578 may be loaded into network device data storage or any other mass memory, to be accessible to run with or as a part of network device operating system 573. Examples of network device application programs may include transcoders, schedulers, calendars, database programs, word processing programs, hypertext transfer protocol (HTTP) programs, customizable user interface programs, IPSec applications, encryption programs, security programs, SMS message servers, IM message servers, email servers, account managers, and so forth. A messaging server 592, website server 579, user data aggregator server 593, a cross-domain multi-profile tracking server 580, and/or user data supplier server 594 may also be included within or implemented as application programs.

A messaging server 592 may include virtually any computing component or components configured and arranged to forward messages from message user agents and/or other message servers, or to deliver messages to a local message store such as network device data storage 574 or the like. Thus, a messaging server 592 may include a message transfer manager to communicate a message employing any of a variety of email protocols including, but not limited to, simple mail transfer protocol (SMTP), post office protocol (POP), Internet message access protocol (IMAP), network new transfer protocol (NNTP) or the like. A messaging server 592 may also be managed by one or more components of the messaging server 592. Thus, the messaging server 592 may also be configured to manage SMS messages; IM, MMS, IRC, or RSS feeds; mIRC; or any of a variety of other message types. In certain embodiments, the messaging server 592 may enable users to initiate and/or otherwise conduct chat sessions, VOIP sessions or the like.

A website server 579 may represent any of a variety of information and services that are configured to provide content, including messages, over a network to another computing device. Thus, a website server 579 can include, for example, a web server, a file transfer protocol (FTP) server, a database server, a content server or the like. A website server 579 may provide the content including messages over the network using any of a variety of formats including, but not limited to WAP, HDML, WML, SGML, HTML, XML, compact HTML (cHTML), extensible HTML (xHTML) or the like. A website server 579 may also be configured to enable a user of a client device to browse websites, upload user data, view and interact with advertisements or the like.

A user data aggregator server 593 is configured to aggregate user data to be provided to user data buyers for advertising campaigns. In certain embodiments, a user data aggregator server 593 may be configured to receive collected user data from a user data supplier server 594. In some embodiments, a user data aggregator server 593 may receive a query for user data. Based on the query, a user data aggregator server 593 may generate a plurality of subsets of aggregated user data. In some embodiments, user data aggregator server 593 may be included in a network device.

A user data supplier server 594 is configured to collect user data. In certain embodiments, the user data supplier server 594 may be configured to provide the collected user data to user data aggregator server 593. In some embodiments, the user data supplier server 594 may collect and/or provide unique user data and/or non-unique user data. In certain embodiments, the user data supplier server 594 may aggregate the collected user data. In some embodiments, the user data supplier server 594 may be included in any computing device such as heretofore described.

Returning to discussion of the heretofore introduced environments, the environments include components with which various systems can be implemented. Not all of the components shown may be required to practice the embodiments, and variations in the arrangement and type of the components may be made without departing from the spirit or scope of the disclosure.

Various environments in which embodiments of the disclosure operate may include local area networks (LANs)/wide area networks (WANs), wireless networks, client devices (e.g., user stations). The overall network, including any sub-networks and/or wireless networks, are in communication with, and enables communication between components in the environment.

Instances of client devices may include virtually any computing device capable of communicating over a network to send and receive information, including instant messages, performing various online activities or the like. It should be recognized that more or fewer client devices may be included within a system such as described herein, and embodiments are therefore not constrained by the number or type of client devices employed.

Devices that may operate as client devices may include devices that can connect using a wired or wireless communications medium such as personal computers, servers, multiprocessor systems, microprocessor-based or programmable consumer electronics, network PCs or the like. In some embodiments, client devices may include virtually any portable computing device capable of connecting to another computing device and receiving information such as a laptop computer, a smart phone, a tablet computer, or the like. Portable or mobile computer devices are may also include or operate in conjunction with other portable devices such as cellular telephones, display pagers, radio frequency (RF) devices, infrared (IR) devices, personal digital assistants (PDAs), handheld computers, wearable computers integrated devices combining one or more of the preceding devices and the like. As such, client devices can range widely in terms of capabilities and features. Moreover, client devices may provide access to various computing applications including a browser or other web-based applications. A web-enabled client device may include a browser application that is configured to receive and to send web pages, web-based messages and the like. The browser application may be configured to receive and display graphics, text, multimedia and the like, employing virtually any web-based language including a wireless application protocol messages (WAP) and the like. In certain embodiments, the browser application is enabled to employ handheld device markup language (HDML), wireless markup language (WML), WMLScript, JavaScript, standard generalized markup language (SGML), HyperText markup language (HTML), eXtensible markup language (XML) and the like, to display and send a message. In certain embodiments, a user of the client device may employ the browser application to perform various activities over a network (online). However, another application may also be used to perform various online activities.

Client devices may include at least one client application that is configured to receive and/or send data between other computing devices (e.g., server components). The client application may include a capability to provide send and/or receive content or the like. The client application may further provide information that identifies itself including a type, capability, name or the like. In certain embodiments, a client device may uniquely identify itself through any of a variety of mechanisms including a phone number, mobile identification number (MIN), an electronic serial number (ESN), or other mobile device identifier. The information may also indicate a content format that the mobile device is enabled to employ. Such information may be provided in a network packet or the like, sent between other client devices, or sent between other computing devices.

Client devices may be further configured to include a client application that enables an end-user to log into an end-user account that may be managed by another computing device. Such end-user accounts, in one non-limiting example, may be configured to enable the end-user to manage one or more online activities including, in one non-limiting example, search activities, social networking activities, browse various websites, communicate with other users, participate in gaming, interact with various applications or the like. However, participation in online activities may also be performed without logging into the end-user account.

A wireless communication capability is configured to couple client devices and other components with network. Wireless network may include any of a variety of wireless sub-networks that may further overlay stand-alone and/or ad-hoc networks and the like, to provide an infrastructure-oriented connection for client devices. Such sub-networks may include mesh networks, wireless LAN (WLAN) networks, cellular networks and the like. In certain embodiments, the system may include more than one wireless network.

A wireless network may further include an autonomous system of terminals, gateways, routers, mobile network edge devices and the like which may be connected by wireless radio links, etc. Connections may be configured to move freely and randomly and organize themselves arbitrarily such that the topology of a wireless network may change rapidly. A wireless network may further employ a plurality of access technologies including AMPS and/or second generation (2G), and/or third generation (3G), and/or fourth generation (4G) generation radio access for cellular systems, WLAN, wireless router (WR) mesh and the like. The foregoing access technologies as well as emerging and/or future access technologies may enable wide area coverage for mobile devices such as client devices with various degrees of mobility. In one non-limiting example, wireless network may enable a radio connection through a radio network access such as a global system for mobile (GSM) communication, general packet radio services (GPRS), enhanced data GSM environment (EDGE), wideband code division multiple access (WCDMA) and the like. A wireless network may include any wireless communication mechanism by which information may travel between client devices and/or between any other computing devices and/or over or between other networks or network components.

Any of the foregoing networks can be configured to couple network devices with other computing devices and communication can include communicating over the Internet. In some situations communication is carried out using combinations of LANs, WANs, as well as direct connections such as through a universal serial bus (USB) port, other forms of computer readable media. On an interconnected set of LANs, including those based on differing architectures and protocols, a router acts as a link between LANs, enabling messages to be sent from one to another. In addition, communications links within LANs may include twisted wire pair or coaxial cable, while communications links between networks may use analog telephone lines, full or fractional dedicated digital lines including T1, T2, T3, and T4, and/or other carrier mechanisms including, for example, E-carriers, integrated services digital networks (ISDNs), digital subscriber lines (DSLs), wireless links including satellite links, or other communications links known to those skilled in the art. Moreover, communications links may further employ any of a variety of digital signaling technologies including, without limit, for example, DS-0, DS-1, DS-2, DS-3, DS-4, OC-3, OC-12, OC-48 or the like. Furthermore, remote computers and other related electronic devices can be remotely connected to either LANs or WANs via a modem and temporary telephone link. In various embodiments, network 108 may be configured to transport information of an Internet protocol (IP). In some cases, communication media carries computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than in a restrictive sense.

What is claimed is:

1. A computer-implemented method, comprising:
receiving, at a data management server, one or more user identifiers, each of the one or more user identifiers obfuscating personally-identifiable information associated with a specific user device;
collecting user data identifying a plurality of user records, each user record of the plurality of user records including a user identifier of the one or more user identifiers and a demographic attribute;
receiving a specification record comprising a demographic attribute to be used in a user record selection operation, the specification record corresponding to a user request for non-personally-identifiable information associated with a user, wherein the data management server cannot share the non-personally-identifiable information unless a correspondence of the non-personally-identifiable information to personally-identifiable information has been obfuscated:
performing the user record selection operation on the plurality of user records to retrieve a first group of user records, each user record in the first group of user records including the demographic attribute comprised in the specification record, wherein one or more user records of the first group of user records includes an additional demographic attribute in addition to the demographic attribute comprised in the specification record, and wherein at least one user record of the first group of user records comprises a user identifier and non-personally-identifiable information;
applying a first set of rules over the first group of user records, the application of the first set of rules forming a second group of user records from the first group of user records by performing the following:
  determining, for a first user record of the first group of user records, whether a value of the demographic attribute comprised in the specification record and included in the first user record is mutually exclusive with a value of the demographic attribute comprised in the specification record and included in a second user record of the first group of user records; and
  in response to determining that the value of the demographic attribute comprised in the specification record and included in the first user record is mutually exclusive with the value of the demographic attribute comprised in the specification record and included in the second user record, excluding the first user record from the first group of user records;
forming a second group of user records based on user records remaining after the exclusion of the first user record from the first group of user records;
modifying the second group of user records so that each user record of the second group of user records includes the demographic attribute comprised in the specification record and the additional demographic attribute that is included in each of the one or more user records of the first group of user records, wherein modifying the second group of user records obfuscates any correspondence of the non-personally-identifiable information to personally-identifiable information;
identifying an anonymity measure associated with the modified second group, wherein the anonymity measure is based at least in part on how many user records are included in the modified second group of user records; and
transmitting a data set representing the modified second group to a recipient after determining that the anonymity measure satisfies a threshold of anonymity, wherein the modified second group is transmitted without sharing personally identifiable information, and wherein the data set is not transmitted after determining that the anonymity measure does not satisfy the threshold of anonymity.

2. The method of claim 1, further comprising applying a second set of rules over the first group of user records, the application of the second set of rules causing one or more second user records to be excluded from the first group of user records, and each of the one or more second user records comprises a second demographic attribute value of a second demographic attribute that is not present in any user records of the modified second group of user records.

3. The method of claim 1, further comprising applying a third set of rules over the first group of user records, the application of the third set of rules causing at least one new user record to be included into the modified second group of user records, and the at least one new user record comprises a demographic attribute value that is the same as the value of the demographic attribute comprised in the specification record and contained in each user record of the modified second group of user records.

4. The method of claim 1, wherein a size of the modified second group of user records comprises at least seven user records.

5. The method of claim 1, further comprising receiving the user identifier from a requestor, wherein the user identifier is an obfuscated ID.

6. The method of claim 5, further comprising transmitting one or more hashed IDs from the data management server to another server.

7. The method of claim 5, wherein the obfuscated ID is a hashed ID.

8. The method of claim 5, wherein the requestor is a website publisher.

9. The method of claim 1, wherein the transmitting further comprises transmitting the modified second group of user records from the data management server to another server.

10. A non-transitory computer readable medium having stored thereon a sequence of instructions which, when stored in memory and executed by a processor, causes the processor to perform a set of acts, the acts comprising:
receiving, at a data management server, one or more user identifiers, each of the one or more user identifiers obfuscating personally-identifiable information associated with a specific user device;
collecting user data identifying a plurality of user records, each user record of the plurality of user records including a user identifier of the one or more user identifiers and a demographic attribute;
receiving a specification record comprising a demographic attribute to be used in a user record selection operation, the specification record corresponding to a request for user non-personally-identifiable information associated with a user, wherein the data management server cannot share the non-personally-identifiable information unless a correspondence of the non-personally-identifiable information to personally-identifiable information has been obfuscated;

performing the user record selection operation on the plurality of user records to retrieve a first group of user records, each user record in the first group of user records including the demographic attribute comprised in the specification record, wherein one or more user records of the first group of user records includes an additional demographic attribute in addition to the demographic attribute comprised in the specification record, and wherein at least one user record of the first group of user records comprises a user identifier and non-personally-identifiable information;

applying a first set of rules over the first group of user records, the application of the first set of rules forming a second group of user records from the first group of user records by performing the following:

determining, for a first user record of the first group of user records, whether a value of the demographic attribute comprised in the specification record and included in the first user record is mutually exclusive with a value of the demographic attribute comprised in the specification record and included in a second user record of the first group of user records; and in response to determining that the value of the demographic attribute comprised in the specification record and included in the first user record is mutually exclusive with the value of the demographic attribute comprised in the specification record and included in the second user record, excluding the first user record from the first group of user records;

forming a second group of user records based on user records remaining after the exclusion of the first user record from the first group of user records;

modifying the second group of user records so that each user record of the second group of user records includes the demographic attribute comprised in the specification record and the additional demographic attribute that is included in each of the one or more user records of the first group of user records, wherein modifying the second group of user records obfuscates any correspondence of the non-personally-identifiable information to personally-identifiable information;

identifying an anonymity measure associated with the modified second group, wherein the anonymity measure is based at least in part on how many user records are included in the modified second group of user records; and transmitting a data set representing the modified second group to a recipient after determining that the anonymity measure satisfies a threshold of anonymity, wherein the modified second group is transmitted without sharing personally identifiable information, and wherein the data set is not transmitted after determining that the anonymity measure does not satisfy the threshold of anonymity.

11. The computer readable medium of claim 10, further storing instructions configured to cause the processor to perform acts of applying a second set of rules over the first group of user records, the application of the second set of rules causing one or more second user records to be excluded from the first group of user records, and each of the one or more second user records comprises a second demographic attribute value of a second demographic attribute that is not present in any user records of the modified second group of user records.

12. The computer readable medium of claim 10, further storing instructions configured to cause the processor to perform acts of applying a third set of rules over the first group user records, the application of the third set of rules causing at least one new user record to be included into the modified second group of user records, and the at least one new user record comprises a demographic attribute value that is the same as the value of the demographic attribute comprised in the specification record and contained in each user record of the modified second group of user records.

13. The computer readable medium of claim 10, wherein a size of the modified second group of user records comprises at least seven user records.

14. The computer readable medium of claim 10, further storing instructions configured to cause the processor to perform acts of receiving the user identifier from a requestor, wherein the user identifier is an obfuscated ID.

15. The computer readable medium of claim 14, wherein the requestor is a website publisher.

16. A system comprising:

one or more processors; and a non-transitory computer-readable storage medium containing instructions configured to cause the one or more processors to perform operations including:

receiving, at a data management server, one or more user identifiers, each of the one or more user identifiers obfuscating personally-identifiable information associated with a specific user device;

collecting user data identifying a plurality of user records, each user record of the plurality of user records including a user identifier of the one or more user identifiers a demographic attribute;

receiving a specification record comprising a demographic attribute to be used in a user record selection operation, the specification record corresponding to a request for non-personally-identifiable information associated with a user, wherein the data management server cannot share the non-personally-identifiable information unless a correspondence of the non-personally-identifiable information to personally-identifiable information has been obfuscated;

performing the user record selection operation on the plurality of user records to retrieve a first group of user records, each user record in the first group of user records including the demographic attribute comprised in the specification record, wherein one or more user records of the first group of user records includes an additional demographic attribute in addition to the demographic attribute comprised in the specification record, and wherein at least user record one of the first group of user records comprise a user identifier and non-personally-identifiable information;

applying a first set of rules over the first group of user records, the application of the first set of rules forming a second group of user records from the first group of user records by performing the following:

determining, for a first user record of the first group of user records, whether a value of the demographic attribute comprised in the specification record and included in the first user record is mutually exclusive with a value of the demographic attribute comprised in the specification record and included in a second user record of the first group of user records; and in response to determining that the value of the demographic attribute comprised in the specification record and included in the first user record is mutually exclusive with the value of the demographic attribute comprised in the specification record and included in the second user record, excluding the first user record from the first group of user records;

forming a second group of user records based on user records remaining after the exclusion of the first user record from the first group of user records;

modifying the second group of user records so that each user record of the second group of user records includes the demographic attribute comprised in the specification record and the additional demographic attribute that is included in each of the one or more user records of the first group of user records, wherein modifying the second group of user records obfuscates any correspondence of the non-personally-identifiable information to personally-identifiable information;

identifying an anonymity measure associated with the modified second group, wherein the anonymity measure is based at least in part on how many user records are included in the modified second group of user records; and transmitting a data set representing the modified second group to a recipient after determining that the anonymity measure satisfies a threshold of anonymity, wherein the modified second group is transmitted without sharing personally identifiable information, and wherein the data set is not transmitted after determining that the anonymity measure does not satisfy the threshold of anonymity.

17. The system of claim 16, wherein the operations further comprise:

applying a second set of rules over the first group of user records, the application of the second set of rules causing one or more second user records to be excluded from the first group of user records, and each of the one or more second user records comprises a second demographic attribute value of a second demographic attribute that is not present in any user record of the modified second group of user records.

18. The system of claim 16, wherein the operations further comprise:

applying a third set of rules over the first group of user records, the application of the third set of rules causing at least one new user record to be included into the modified second group of user records, and the at least one new user record comprises a demographic attribute value that is the same as the value of the demographic attribute comprised in the specification record and contained in each user record of the modified second group of user records.

* * * * *

UNITED STATES PATENT AND TRADEMARK OFFICE
CERTIFICATE OF CORRECTION

PATENT NO. : 11,120,163 B2
APPLICATION NO. : 14/941047
DATED : September 14, 2021
INVENTOR(S) : Tawakol et al.

Page 1 of 1

It is certified that error appears in the above-identified patent and that said Letters Patent is hereby corrected as shown below:

In the Specification

In Column 8, Line 35, delete "IDI-ID7" and insert -- ID1-ID7 --, therefor.

In Column 8, Line 47, delete ""auto"." and insert -- "auto"). --, therefor.

In Column 8, Line 51, delete "302)." and insert -- 302. --, therefor.

In Column 9, Line 34, delete "include" and insert -- include, --, therefor.

In Column 14, Line 33, delete "PTSN" and insert -- PSTN --, therefor.

In Column 15, Line 14, delete "(e.g.," and insert -- e.g., --, therefor.

In the Claims

In Column 23, Line 31, in Claim 1, delete "obfuscated:" and insert -- obfuscated; --, therefor.

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*